(12) United States Patent
Niwa et al.

(10) Patent No.: US 10,399,159 B2
(45) Date of Patent: Sep. 3, 2019

(54) JIGSAW

(71) Applicant: MAKITA CORPORATION, Anjo-shi, Aichi (JP)

(72) Inventors: Kenta Niwa, Anjo (JP); Fumihide Sugita, Anjo (JP); Toshiyuki Kani, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 0 days.

(21) Appl. No.: 15/810,879

(22) Filed: Nov. 13, 2017

(65) Prior Publication Data

US 2018/0200810 A1    Jul. 19, 2018

(30) Foreign Application Priority Data

Jan. 13, 2017    (JP) ................................. 2017-004454

(51) Int. Cl.
| | |
|---|---|
| *B23D 49/16* | (2006.01) |
| *B23D 59/00* | (2006.01) |
| *B23D 51/01* | (2006.01) |
| *B25F 5/02* | (2006.01) |

(52) U.S. Cl.
CPC .......... *B23D 49/162* (2013.01); *B23D 51/01* (2013.01); *B23D 59/001* (2013.01); *B23D 59/006* (2013.01); *B25F 5/02* (2013.01)

(58) Field of Classification Search
CPC .... B23D 49/162; B23D 51/01; B23D 59/001; B23D 59/006; B25F 5/02
See application file for complete search history.

(56) References Cited

U.S. PATENT DOCUMENTS

| | | | | |
|---|---|---|---|---|
| D446,703 S | * | 8/2001 | Netzler | ............................. D8/64 |
| D531,869 S | * | 11/2006 | Netzler | ............................. D8/64 |
| D562,096 S | * | 2/2008 | Taniguchi | ........................ D8/64 |
| 2003/0167641 A1 | * | 9/2003 | Teng | ...................... B23D 51/10 30/337 |
| 2012/0131803 A1 | * | 5/2012 | Aoyama | ................... B25F 5/02 30/277.4 |

FOREIGN PATENT DOCUMENTS

| | | |
|---|---|---|
| JP | H08-244005 A | 9/1996 |
| JP | 2012-110977 A | 6/2012 |
| JP | 2012-111021 A | 6/2012 |
| JP | 2012-121116 A | 6/2012 |
| JP | 2013-223899 A | 10/2013 |
| JP | 2014-004666 A | 1/2014 |
| JP | 2015-024489 A | 2/2015 |

* cited by examiner

*Primary Examiner* — Omar Flores Sanchez
(74) *Attorney, Agent, or Firm* — Oliff PLC

(57) ABSTRACT

A jigsaw includes a jigsaw main body, a handle, and a battery. The jigsaw main body includes a housing, a motor disposed inside the housing, and a battery mounting portion having a first mounting surface facing downward. The handle is disposed at an upper portion of the jigsaw main body and above the motor. The battery has a second mounting surface and supplies the motor with an electric power. The battery is slidable along the first mounting surface and mountable to the battery mounting portion with the first and second mounting surfaces facing each other.

14 Claims, 25 Drawing Sheets

JIGSAW

BACKGROUND

This application claims the benefit of Japanese Patent Application Number 2017-004454 filed on Jan. 13, 2017, the entirety of which is incorporated by reference.

TECHNICAL FIELD

The disclosure relates to a jigsaw that cuts a workpiece with a blade.

RELATED ART

Japanese Patent Application Publication No. 2012-121116 (JP-A-2012-121116) discloses a jigsaw in which a reciprocatable rod projects downward at a front of left and right half housings and a cutting blade (a blade) is mounted to the reciprocatable rod. A motor as a driving source of the reciprocation is disposed in a housing. A fan is mounted to the motor, and exhaust air from the fan is introduced to first blow passages and second blow passages. These blow passages are formed between left (right) outer surfaces of the housing and a cover member mounted to an outside of the housing. The first blow passages are formed to the right and the left such that the exhaust air flows toward a top dead center of a blade attachment portion of the rod. The second blow passages are formed to the right and the left such that the exhaust air flows toward a cutting site.

Additionally, a dust collection passage is formed in a front-rear direction at a lower side of the housing. A dust collection port (an air intake port) is open at a front end of the dust collection passage. A dust collector is coupled to the dust collection passage to suction a cutting dust around the cutting site into the dust collection passage.

Japanese Patent Application Publication No. 2012-110977 (JP-A-2012-110977) discloses a jigsaw that includes a ventilation flue (a blow passage) which opens to a lower surface of a housing at a rear of a blade and leads to a blow nozzle disposed at a center in a right-left direction, a dust collection passage which penetrates in a front-rear direction at a lower portion of the housing and opens as a dust collection port at a lower side of the blow nozzle, and a shutter member which obstructs the ventilation flue by coupling of a dust collection nozzle to the dust collection passage.

Japanese Patent Application Publication No. 2014-4666 (JP-A-2014-4666) discloses a jigsaw that includes a dust collection nozzle of a dust collection passage at a center in a right-left direction.

Japanese Patent Application Publication No. 8-244005 (JP-A-8-244005) discloses that a dust suction nozzle of a dust suction device of a jigsaw is mounted to a base of the jigsaw and is deposed on a right side or a left side of a blade.

Japanese Patent Application Publication No. 2012-111021 (JP-A-2012-111021) and Japanese Patent Application Publication No. 2015-24489 (JP-A-2015-24489) disclose jigsaws where a base abutting on a top surface of a workpiece is mounted to a lower surface of a housing by inserting a base-fixing bolt.

A second embodiment of Japanese Patent Application Publication No. 2013-223899 (JP-A-2013-223899) discloses a top handle type jigsaw in which a handle is disposed to extend between a front portion and a rear end of a housing. In the jigsaw, a front-rear length of the handle is shortened, and the jigsaw is made compact in a front-rear direction by an amount that the jigsaw becomes comparatively large in a vertical direction due to installation of the handle. Therefore, the battery pack is configured to be removably attached by vertically sliding a battery pack with respect to a rear end surface of the housing and a rear end surface of the handle.

Additionally, a first embodiment discloses a body handle type jigsaw that includes a non-slip portion which is disposed at an upper portion of a housing of a main body, gripped by an operator. Since the housing (the body) itself serves as the handle and the jigsaw becomes comparatively small in the vertical direction, a length of the main body is configured to be comparatively large and the battery pack is mounted to a lower surface at a rear portion of the housing.

Since the jigsaw of JP-A-2012-121116 includes the blow passages between the cover member and the outer surfaces of the housing, the structure becomes complicated and a blow port and the dust collection port are far from the blade.

With the jigsaw of JP-A-2012-110977, since the shutter member is disposed, the structure becomes complicated. Additionally, since the blow nozzle is disposed at the center in the right-left direction, an area on which exhaust air and dust collection act is comparatively narrow, making strength of blowing comparatively weak when the number of rotations of the fan is small.

The jigsaw of JP-A-2014-4666 does not include a blow port, therefore, a cutting dust cannot be blown off, resulting in comparatively poor dust collection efficiency.

The dust suction device of JP-A-8-244005 does not include a blow port, therefore, a cutting dust cannot be blown off, resulting in comparatively poor dust collection efficiency. Additionally, since a dust collection nozzle is disposed only at one of the right side or the left side, an area on which the dust collection acts is biased.

Therefore, one main object of the relevant disclosure is to provide a jigsaw with a simple structure or a jigsaw that has a wide area on which at least one of blowing of air and dust collection act and the efficiency is excellent.

With the jigsaws of JP-A-2012-111021 and JP-A-2015-24489, the base is directly secured to the housing with the bolt. Accordingly, a rattling of the bolt and a warp of the housing near the bolt are likely to cause vibrations between the base and the housing comparatively.

Therefore, one main object of the relevant disclosure is to provide a jigsaw in which a base is further firmly mounted to a housing to reduce vibrations at the base and the housing.

Further, in the case where an independent handle is desired, if the battery pack is disposed at the rear of the rear end surface of the housing and at the rear of the rear end surface of the handle like the jigsaw according to the second embodiment of JP-A-2013-223899, the front-rear length of the jigsaw with the battery pack mounted is lengthened compared with that of the jigsaw with no battery pack mounted. If the battery pack with larger capacity is mounted, the front-rear length of the jigsaw is further lengthened compared with that of the jigsaw in which the battery pack with small capacity is mounted.

Therefore, one main object of the disclosure is to provide a top handle type jigsaw with ease of handling that includes an independent handle at an upper portion of an electric motor where a front-rear length hardly changes even if batteries with various capacities are mounted or no battery is mounted.

SUMMARY

In order to achieve the above-described object, there is provided a jigsaw according to a first aspect of the disclosure. The jigsaw may include a jigsaw main body, a handle, and a battery. The jigsaw main body may include a housing, a motor disposed inside the housing, and a battery mounting portion having a first mounting surface facing downward. The handle may be disposed at an upper portion of the jigsaw main body and above the motor. The battery may have a second mounting surface and be configured to supply the motor with an electric power. The battery may be slidable along the first mounting surface. The battery may be mountable to the battery mounting portion with the first and second mounting surfaces facing each other.

In a second aspect of the disclosure, which is in the above-described aspect, the battery may be mountable to the battery mounting portion such that the battery overlaps with the motor in a front view.

In third and fourth aspects of the disclosure, which are in the above-described aspect, the battery may be mountable to the battery mounting portion such that the battery overlaps with the handle in a top view.

In fifth to seventh aspects of the disclosure, which are in the above-described aspect, the jigsaw may include a plate-shaped controller configured to control the motor. The controller may be disposed above the battery and along the second mounting surface.

In eighth to tenth aspects of the disclosure, which are in the above-described aspect, the controller may be arranged such that the controller overlaps with the handle in a top view.

In an eleventh aspect of the disclosure, which is in the above-described aspect, the jigsaw may include a centrifugal fan, a cooling air intake port, and a controller, The centrifugal fan may be disposed inside the housing. The cooling air intake port may be disposed at a rear part at the housing with respect to the motor. The cooling air intake port may be configured to cool the motor. The controller may be configured to control the motor. The controller may be disposed along an imaginary straight line passing through the centrifugal fan and the cooling air intake port.

In a twelfth aspect of the disclosure, which is in the above-described aspect, the jigsaw may include a dust suction adapter coupled to a hose for a dust collection device. The dust suction adapter may be detachably attached below the battery. The battery may be disposed at a rear of the motor.

In a thirteenth aspect of the disclosure, which is in the above-described aspect, the dust suction adapter may include a front portion, a rear portion located below the front portion, and a bent portion connecting the front portion and the rear portion.

In a fourteenth aspect of the disclosure, which is in the above-described aspect, the jigsaw may include a fastening member having a conductive property and be disposed inside the housing. The jigsaw may also include a base connected to the housing at a lower side of the housing with the fastening member. The dust suction adapter may be mountable such that the dust suction adapter contacts the fastening member.

In a fifteenth aspect of the disclosure, which is in the above-described aspect, the battery may be disposed at the rear of the motor. The battery may be mountable to the battery mounting portion by sliding in a front-rear direction.

In a sixteenth aspect of the disclosure, which is in the above-described aspect, the jigsaw may include the controller configured to control the motor and including a switching element. The motor may be a brushless motor including a stator having a plurality of coils and a rotor. The switching element may switch an electric power supply to the plurality of coils.

According to a seventeenth aspect of the disclosure, there is provided a jigsaw for installing a battery. The jigsaw may include a jigsaw main body and a handle. The jigsaw main body may include a housing, a motor disposed inside the housing, and a battery mounting portion having a first mounting surface facing downward. The battery mounting portion may be configured to install the battery. The handle may be disposed at an upper portion of the jigsaw main body and above the motor.

In an eighteenth aspect of the disclosure, which is in the above-described aspect, the jigsaw may include the battery having a second mounting surface. The battery may be configured to supply the motor with an electric power. The battery may be slidable along the first mounting surface. The battery may be mountable to the battery mounting portion with the first and second mounting surfaces facing each other.

A relevant aspect may include the housing, the centrifugal fan disposed inside the housing, the groove portions, and the guiding member. The housing may have a left housing and a right housing, and the motor and the drive unit may be disposed inside the housing. The groove portions may be formed depressed outside in the right-left direction on the inner surfaces of at least one of the left housing and the right housing and parts extending from the lower side of the centrifugal fan forward. The guiding member may be disposed continuous with the groove portions at the inside of the housing. The exhaust passage may be formed of the groove portions and the guiding member and disposed forward such that the exhaust air from the centrifugal fan passes through the exhaust passage. The exhaust port opens forward.

Further, with the relevant disclosure, which is in the above-described aspect, the guiding member may include the partition portion that branches the exhaust passage into the right and the left.

Further, with the relevant disclosure, which is in the above-described aspect, the guiding member may include the dust collection air intake port penetrating in the front-rear direction.

Further, the relevant disclosure, which is in the above-described aspect, the jigsaw may include the cooling air intake port and the controller. The cooling air intake port may be disposed at a rear part at the housing with respect to the motor. The cooling air intake port may be configured to cool the motor. The controller may be configured to control the motor. The controller may be disposed along an imaginary straight line passing through the centrifugal fan and the cooling air intake port.

Further, with the relevant disclosure, which is in the above-described aspect, the jigsaw may include a dust suction adapter coupled to a hose for a dust collection device. The dust suction adapter may be detachably attached below the battery. The battery may be disposed at a rear of the motor.

Further, with the relevant disclosure, which is in the above-described aspect, the dust suction adapter may include a front portion, a rear portion located below the front portion, and a bent portion connecting the front portion and the rear portion.

Further, the relevant disclosure, which is in the above-described aspect, the jigsaw may include a fastening member having a conductive property and be disposed inside the housing. The jigsaw may also include a base connected to the housing at a lower side of the housing with the fastening member. The dust suction adapter may be mountable such that the dust suction adapter contacts the fastening member.

Further, the relevant disclosure may include the jigsaw main body, the base, the fastening member, and the fastener. The jigsaw main body may include the housing made of the resin, the motor disposed inside the housing, and the drive unit. The base may support the jigsaw main body tiltable to the right and the left. The fastening member may press the jigsaw main body to the base. The fastener may penetrate the base, the jigsaw main body, and the fastening member. The fastener may fix the jigsaw main body to the base by the axial tension. The fastening member may have the pressing surface extending in the front-rear direction.

Further, with the relevant disclosure, which is in the above-described aspect, the fastening member may extend to the rear of the fastener.

Further, with the relevant disclosure, which is in the above-described aspect, the length of the pressing surface of the fastening member in the front-rear direction may be equal to or more than the half of the length of the contact surface of the jigsaw main body and the base in the front-rear direction.

Further, with the relevant disclosure, which is in the above-described aspect, the fastening member may have the standing portions standing in the vertical direction and extending in the front-rear direction.

Further, with the relevant disclosure, which is in the above-described aspect, the front end portion of the fastening member may be adjacent to the contact ribs formed at the housing.

Further, with the relevant disclosure, which is in the above-described aspect, the fastening member may be the metal plate having the bent portions.

Further, with the relevant disclosure, which is in the above-described aspect, the fastening member may have the U shape in the front view.

Further, with the relevant disclosure, which is in the above-described aspect, the fastening member may include the fastener overlap portion. The fastener may penetrate the fastener overlap portion so as to overlap with the fastener overlap portion in the side view.

Further, with the relevant disclosure, which is in the above-described aspect, the fastening member may have the small piece portions at at least one of the front end portion and the rear end portion. The housing may include the small piece receiving portions, which receive the small piece portions.

Further, with the relevant disclosure, which is in the above-described aspect, the small piece receiving portions may be disposed at the top and the bottom of the small piece portions.

One main effect related to the embodiments is to provide the top handle type jigsaw with ease of handling that includes the independent handle at the upper portion of the electric motor where the front-rear length hardly changes even if batteries with various capacities are mounted or no battery is mounted.

One main effect related to the relevant embodiments is to provide the jigsaw with the simple structure or the jigsaw that has the wide area on which at least one of the blowing of air and the dust collection act and the efficiency is excellent.

One main effect related to the relevant embodiments is to provide the jigsaw in which the base is further firmly mounted to the housing to reduce the vibrations at the base and the housing.

DETAILED DESCRIPTION

The following describes embodiments and modification examples of the embodiments with reference to the drawings as necessary.

The front, rear, up, down, right, and left are defined in these embodiments and modification examples for convenience of explanation and therefore may change depending on a usage condition, a state of moving member, and a similar state.

Further, the disclosure is not limited to the following embodiments and modification examples.

Figure 1:
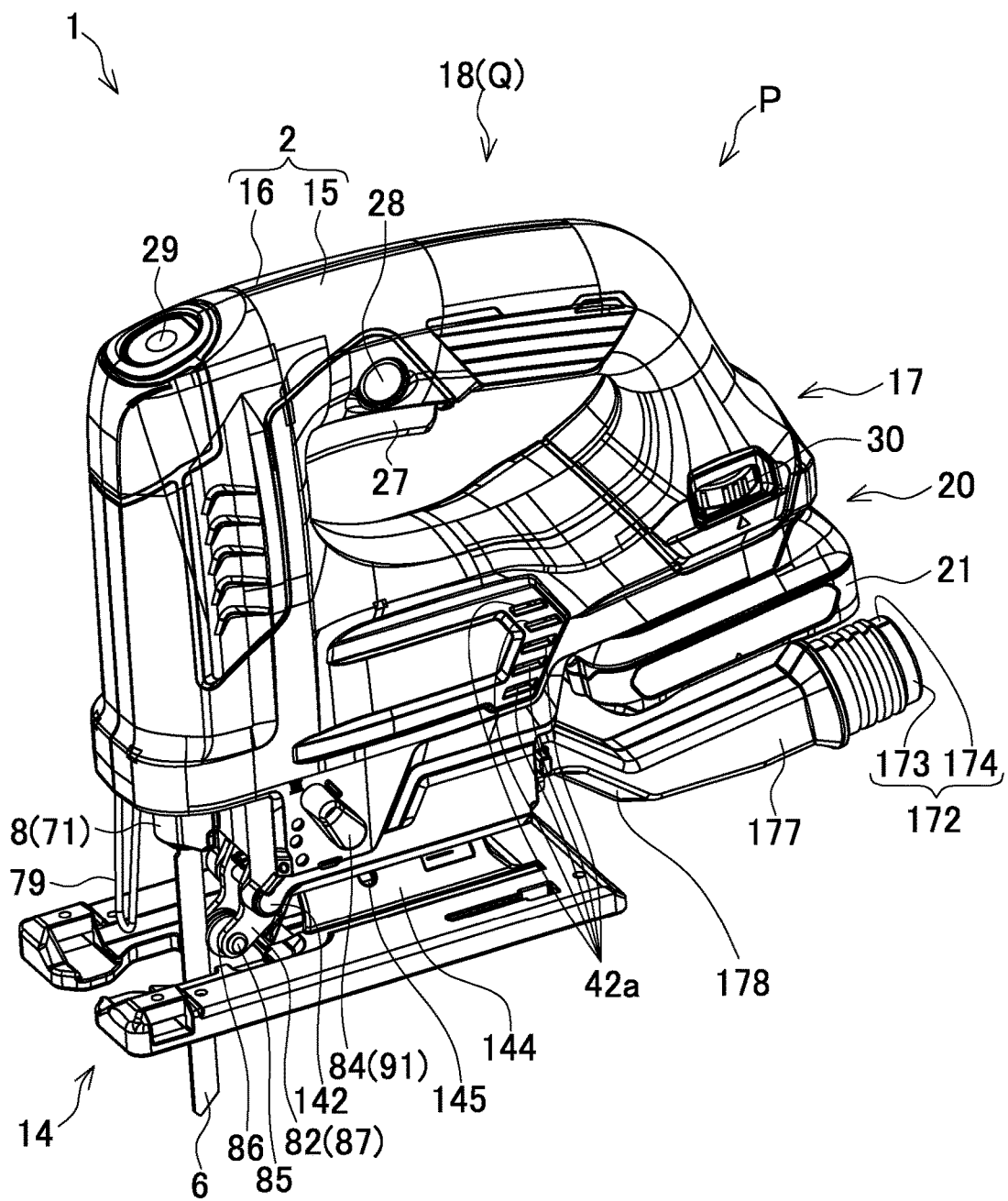
FIG. 1 is a perspective view of a jigsaw according to a first embodiment of the disclosure.
Figure 2:
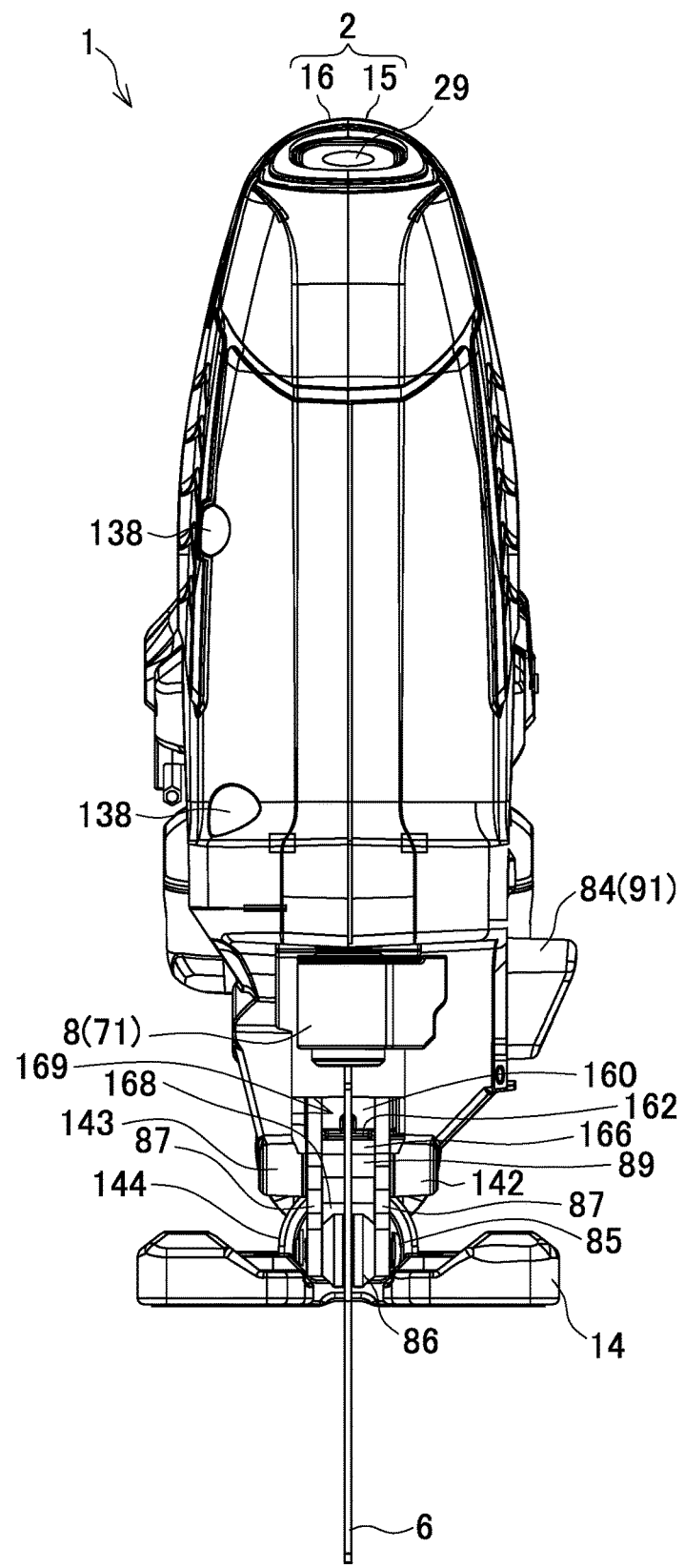
FIG. 2 is a front view of FIG. 1.
Figure 3:
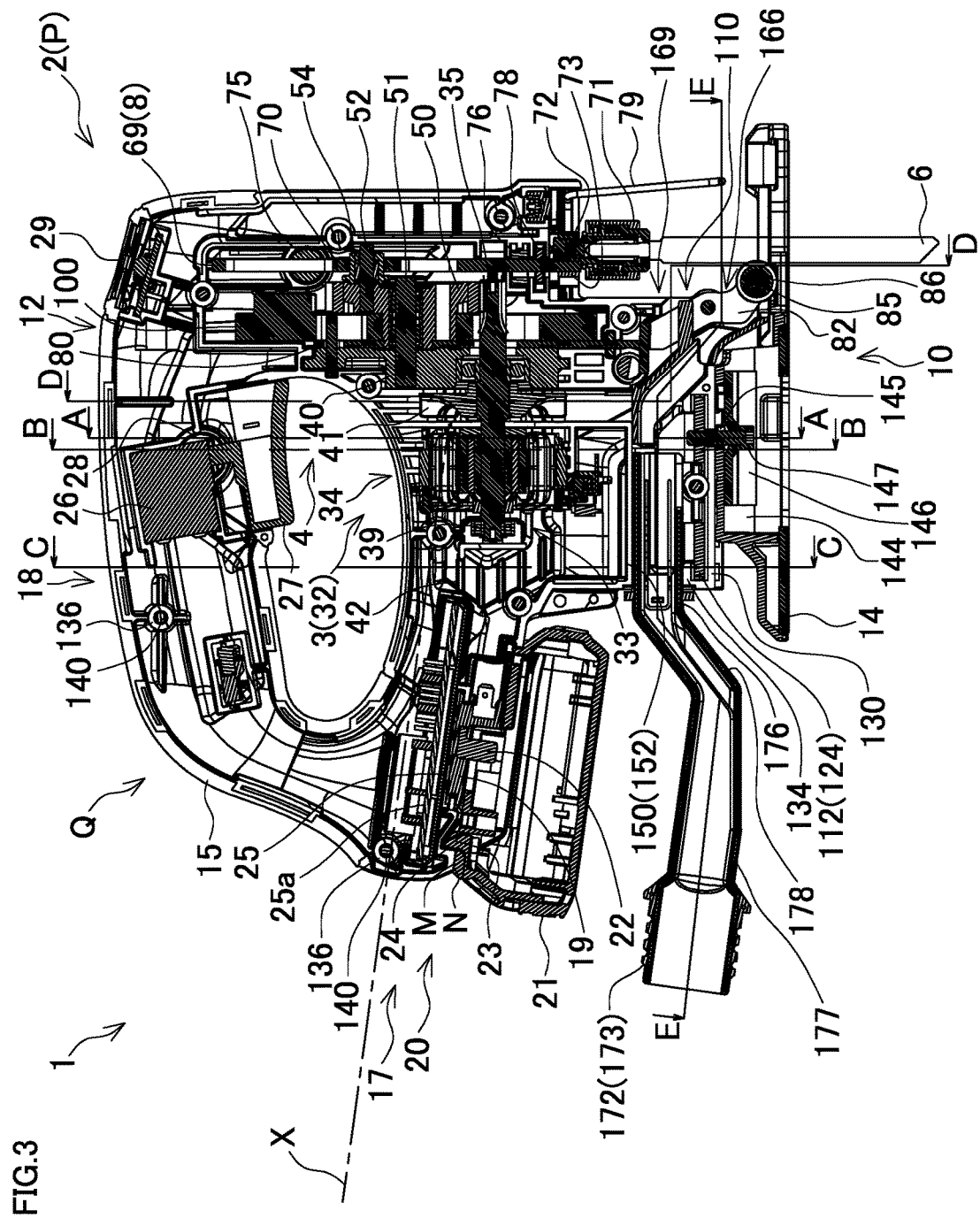
FIG. 3 is a center vertical cross-sectional view of FIG. 1.
Figure 4:
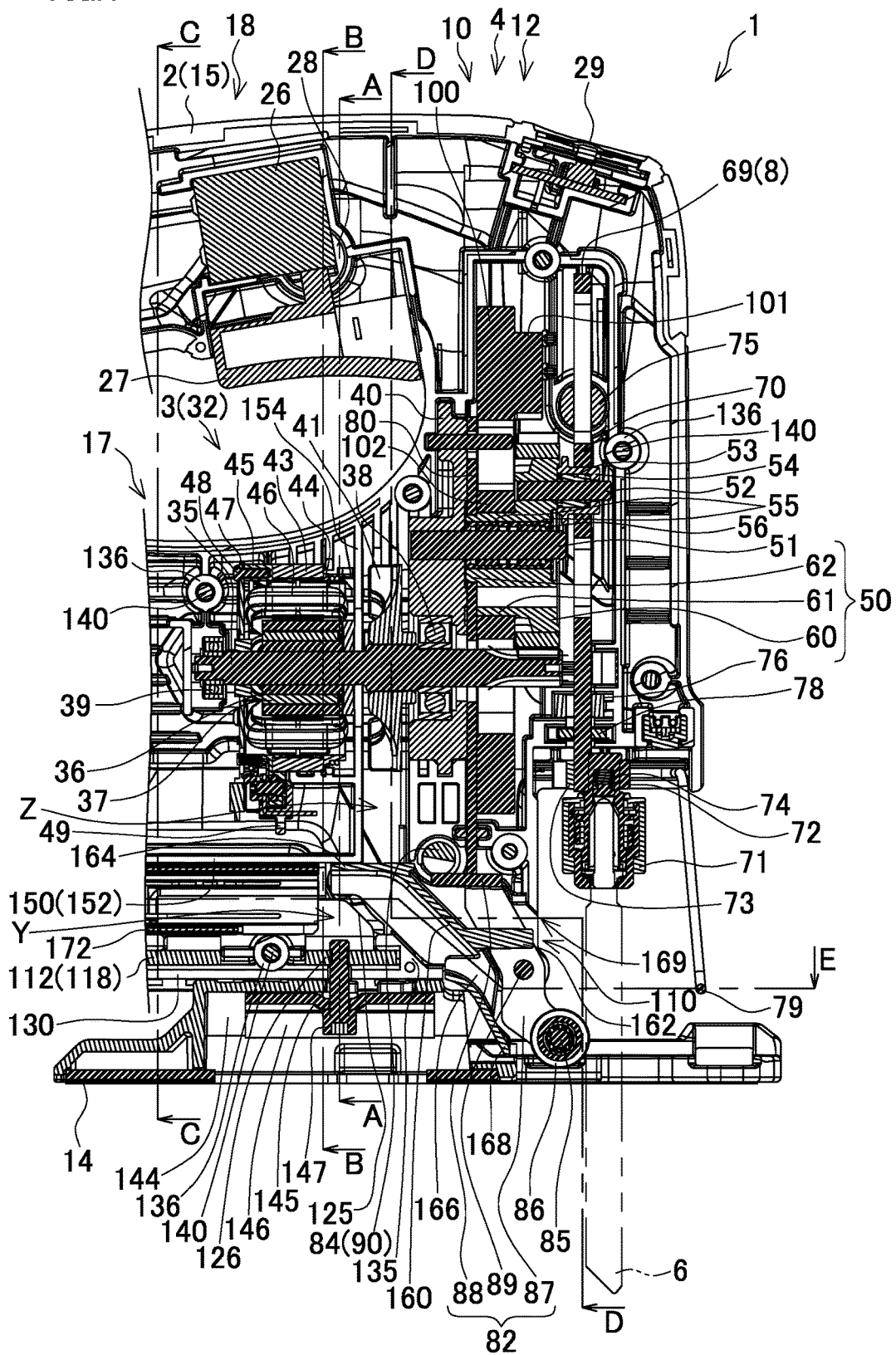
FIG. 4 is a front enlarged view of FIG. 3.
Figure 5:
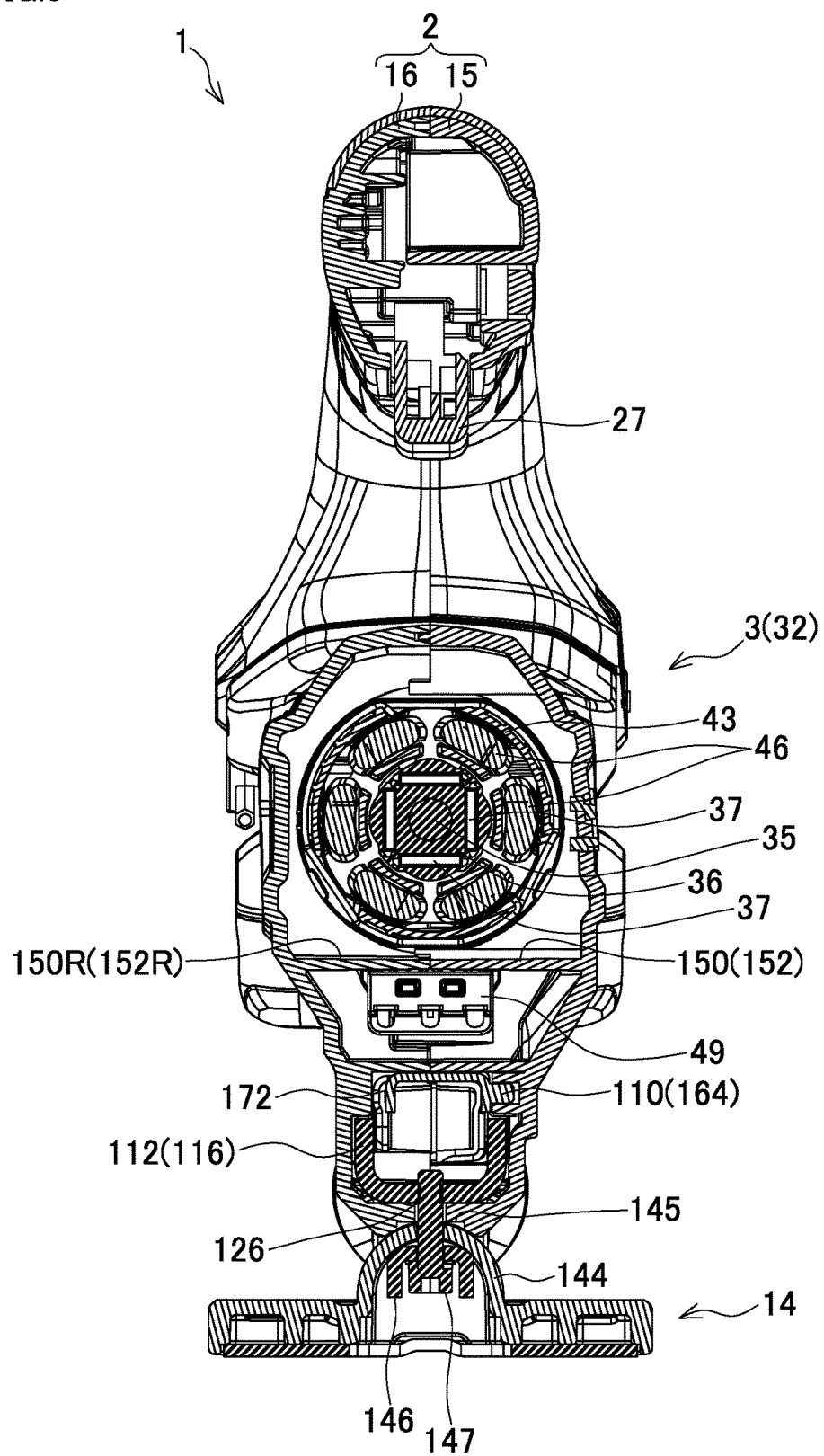
FIG. 5 is a cross-sectional view taken along the line A-A in FIG. 3.

FIG. 1 is a perspective view of a rechargeable jigsaw 1 as one example of a cutting machine according to the first embodiment of the embodiments. FIG. 2 is a front view of FIG. 1. FIG. 3 is a center vertical cross-sectional view of FIG. 1. FIG. 4 is a front enlarged view of FIG. 3. FIG. 5 is a cross-sectional view taken along the line A-A in FIG. 3.

Figure 6:
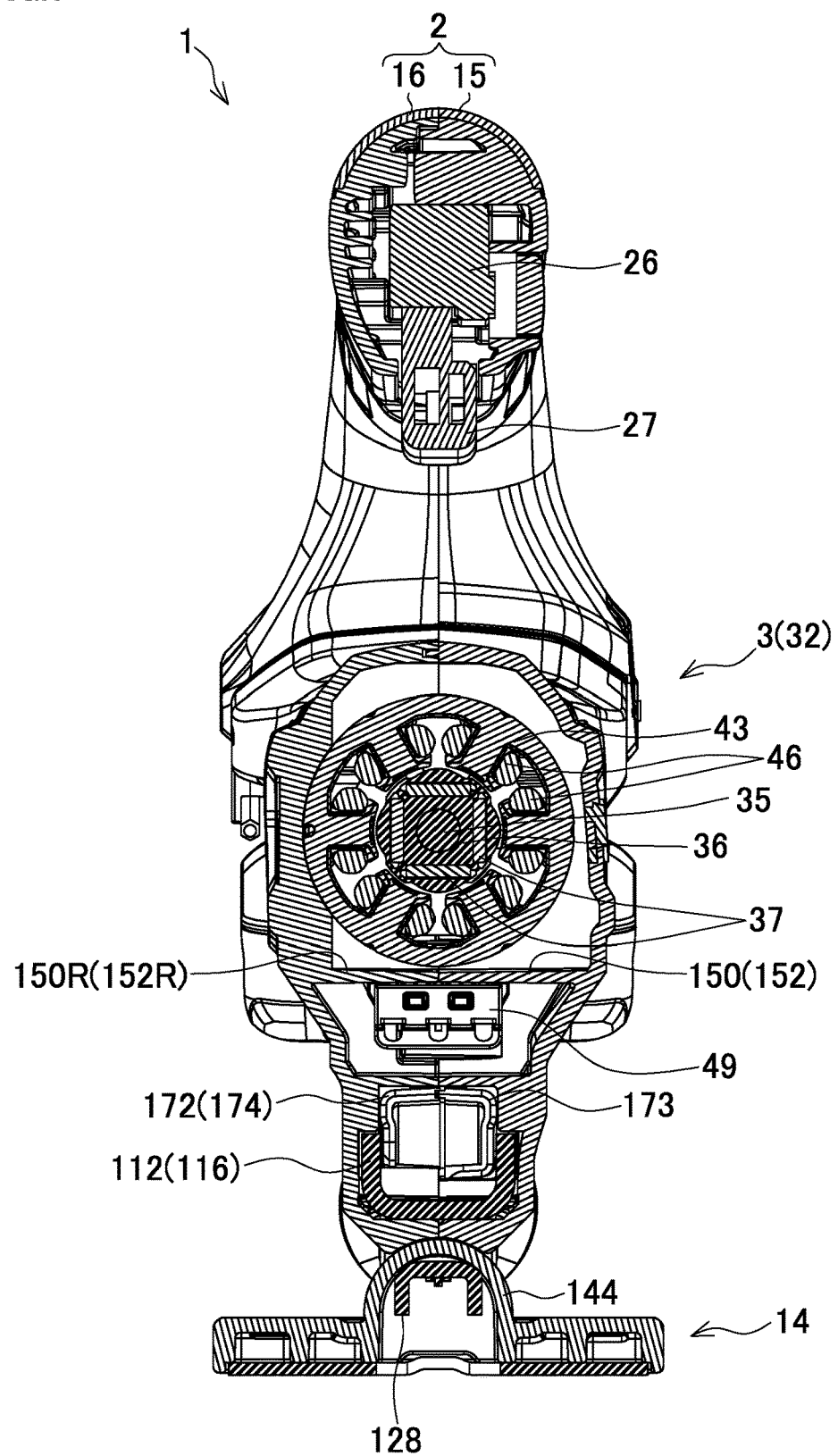
FIG. 6 is a cross-sectional view taken along the line B-B in FIG. 3.
Figure 7:
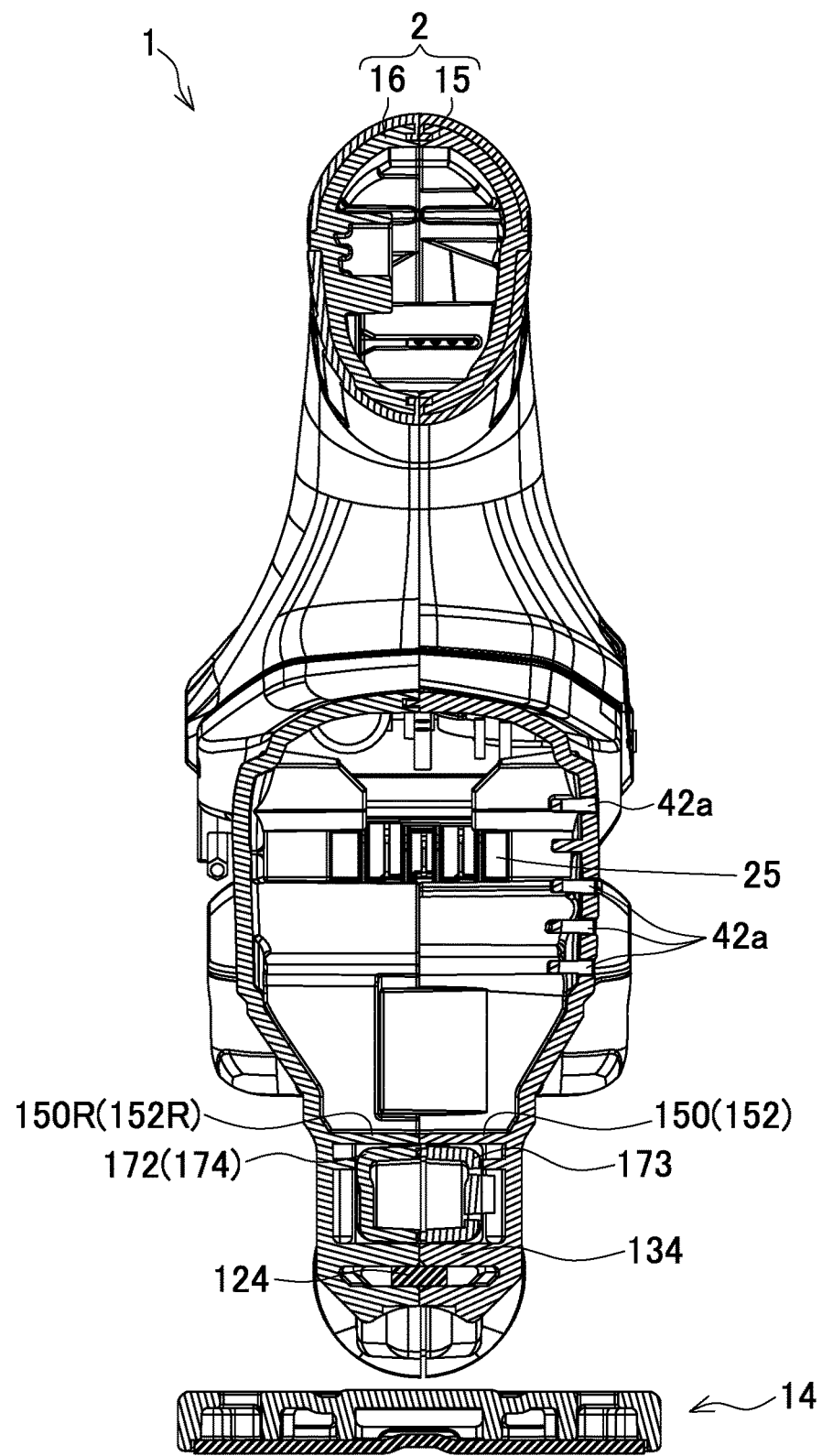
FIG. 7 is a cross-sectional view taken along the line C-C in FIG. 3.
Figure 8:
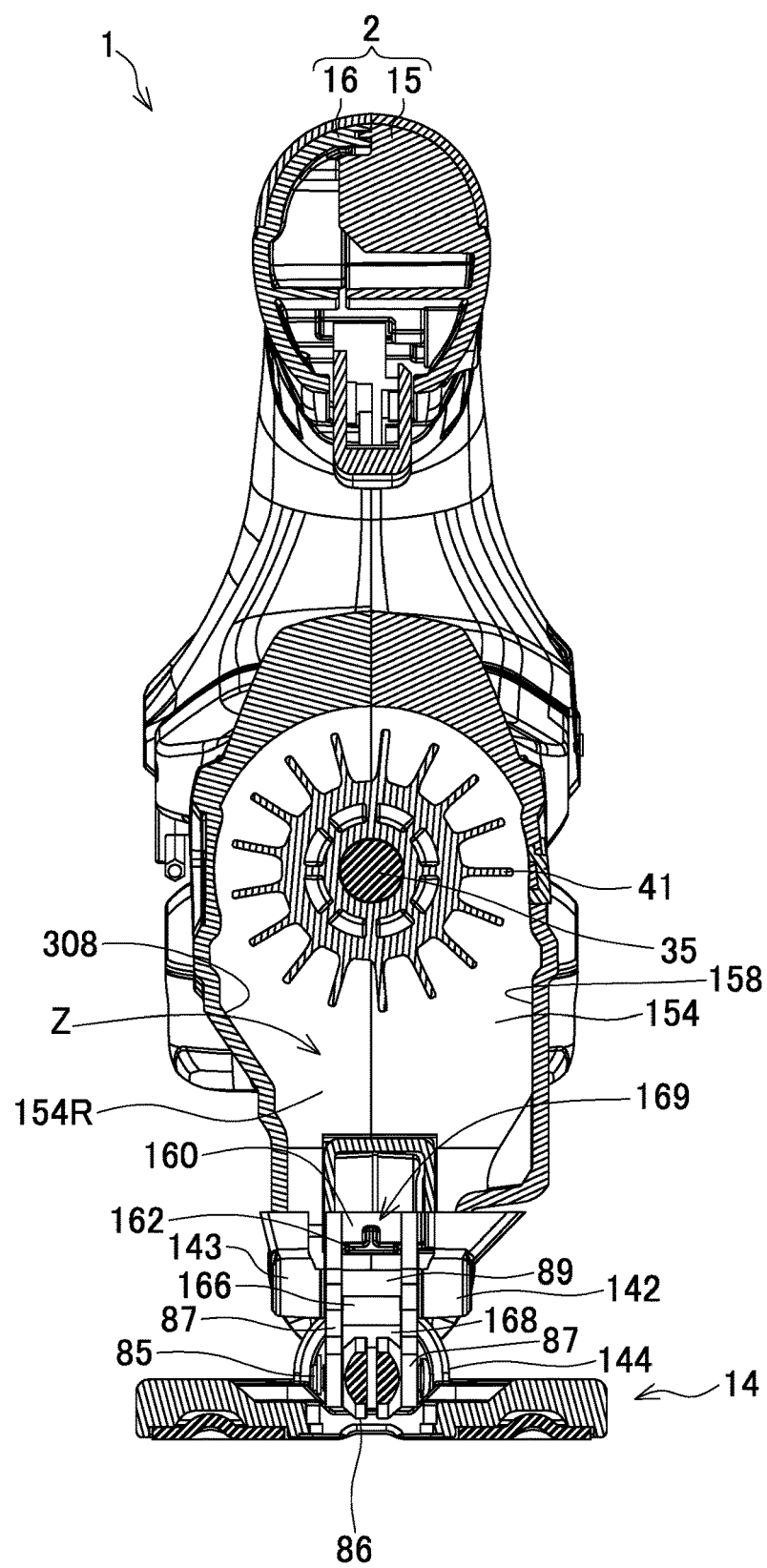
FIG. 8 is a cross-sectional view taken along the vertical line D-D in FIG. 3.
Figure 9:
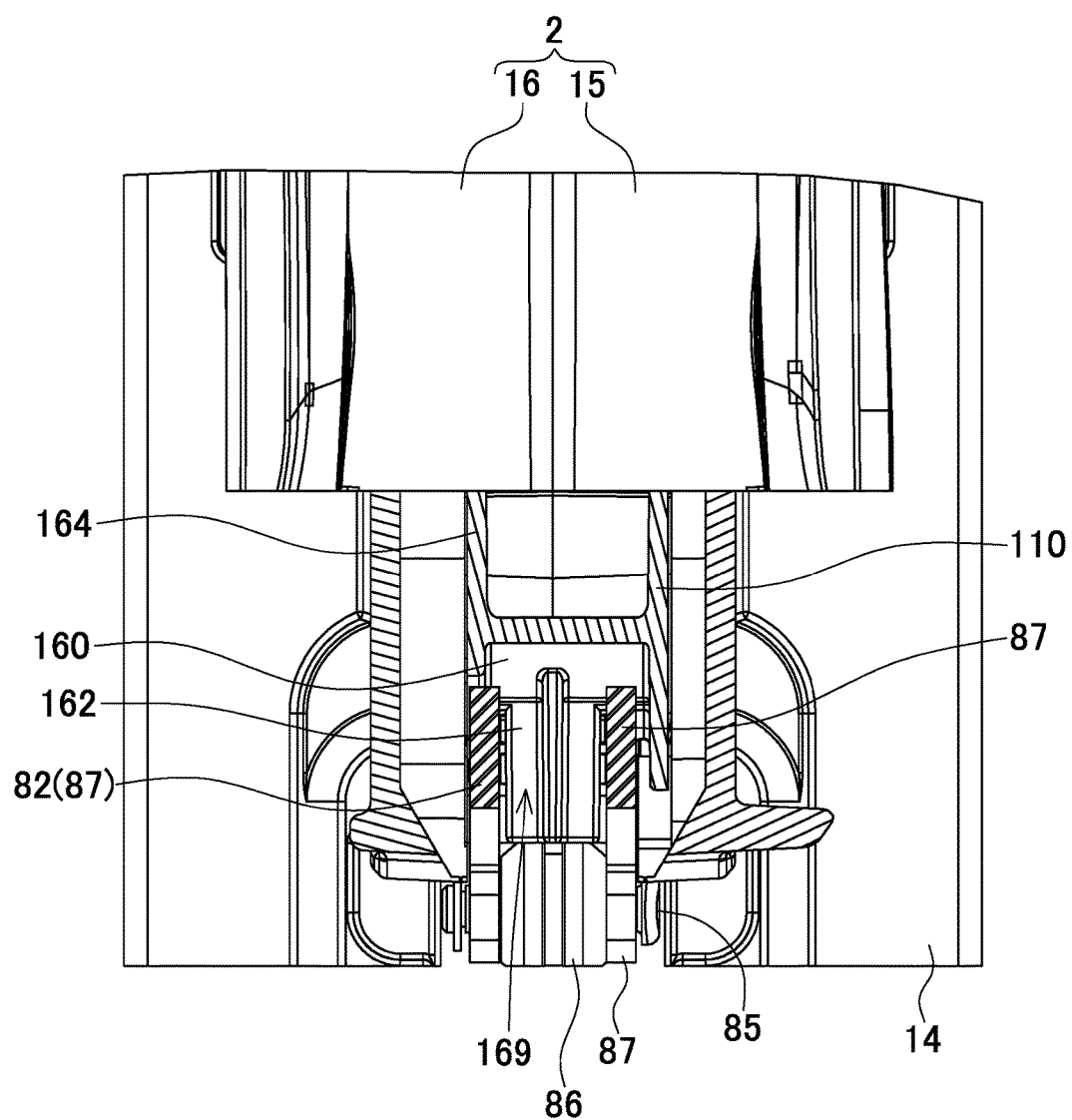
FIG. 9 is a cross-sectional view taken along the lateral line D-D in FIG. 3.
Figure 10:
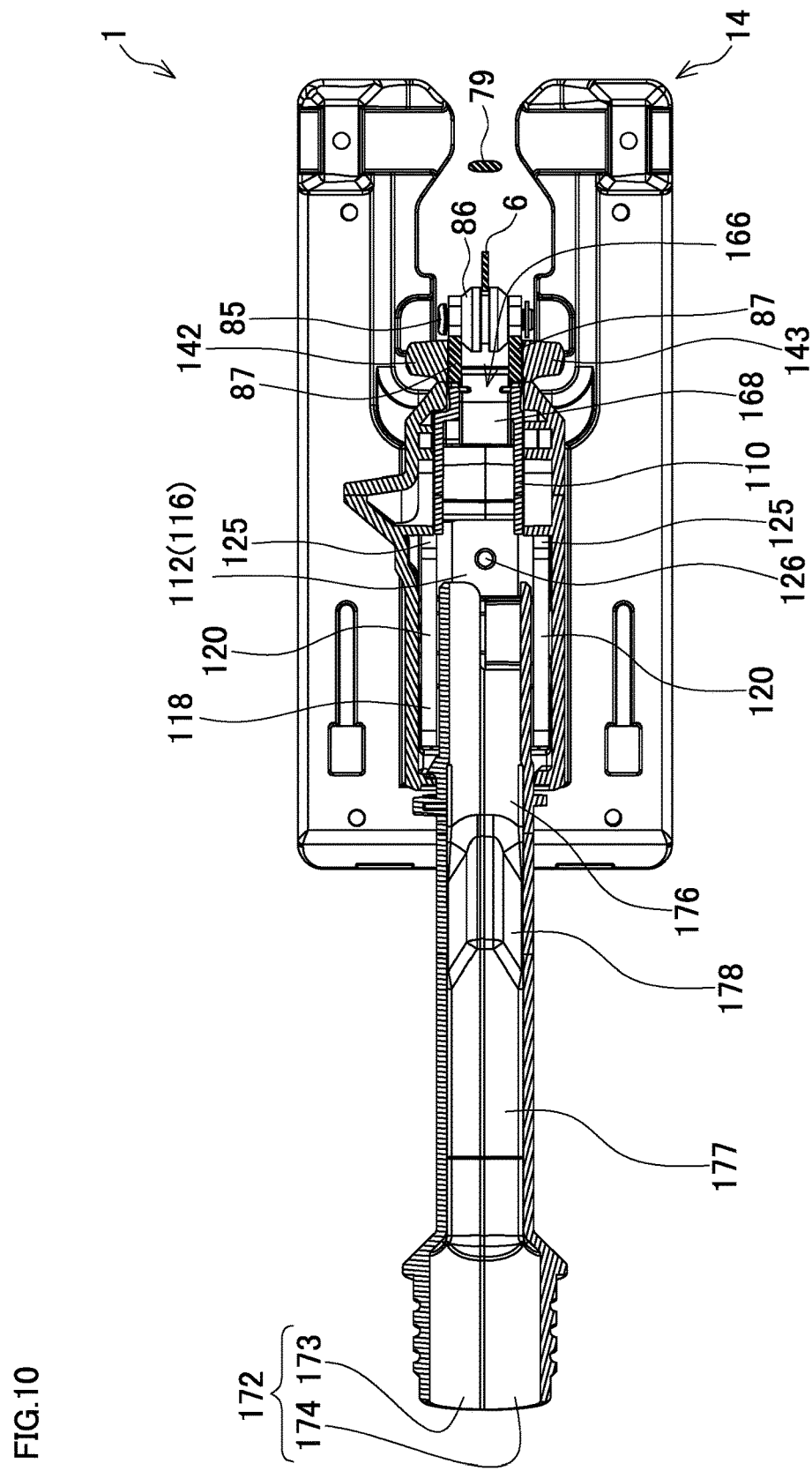
FIG. 10 is a cross-sectional view taken along the line E-E in FIG. 3.

FIG. 6 is a cross-sectional view taken along the line B-B. FIG. 7 is a cross-sectional view taken along the line C-C. FIG. 8 is a cross-sectional view taken along the vertical line D-D. FIG. 9 is a cross-sectional view taken along the lateral line D-D. FIG. 10 is a cross-sectional view taken along the line E-E. The right in FIG. 3 is the front of the jigsaw 1, the upper side in FIG. 2 and FIG. 3 is the upper side of the jigsaw 1, and the right in FIG. 2 is the left of the jigsaw 1.

The jigsaw 1 includes an internal mechanism (including a member partially exposed from a housing) inside a housing 2 as a contour.

The internal mechanism of the jigsaw 1 includes a power unit 3, a power transmission unit 4 as a reciprocating mechanism, a slider 8 as a drive unit, an orbital motion mechanism 10, a counter weight 12, and a base 14. A blade 6 is mountable to the slider 8, and the slider 8 can perform a vertical motion (a vertical reciprocating operation). The orbital motion mechanism 10 causes the blade 6 during vertical motion to swing in a front-rear direction for movement on an elliptoid trajectory. The counter weight 12 is for the blade 6 and the slider 8, which perform the vertical motion.

The housing 2 is made of a resin (a synthetic resin), is laterally halved, and includes a left housing 15 and a right housing 16.

The housing 2 includes the power unit 3, the power transmission unit 4, the slider 8, the orbital motion mechanism 10, a housing base portion 17 inside of which the counter weight 12 is disposed, and a handle portion 18, which is formed on the upper side of the housing base portion 17 (the power unit 3).

The housing 2 and the internal mechanism at least a part of which is disposed inside the housing 2 constitute a main body P (a jigsaw main body) of the jigsaw 1. The handle portion 18 and the internal mechanism disposed inside the handle portion 18 constitute a handle Q of the jigsaw 1. The jigsaw 1 is a top handle type in which the handle Q is disposed on the upper side of the power unit 3. The handle Q may be constituted of only the handle portion 18 in the housing 2, that is, the handle portion 18 needs not to include the internal mechanism.

A battery mounting portion 20 including a battery connecting terminal 19 is disposed at a rear lower surface of the housing base portion 17. The battery mounting portion 20 has a first mounting surface M, which expands from side to side and back and forth (slightly oblique in a state of upward to the rear) and faces downward. The battery connecting terminal 19 is disposed at the first mounting surface M.

A battery 21 is mounted to the battery mounting portion 20. The battery 21 is a rechargeable secondary battery and has a second mounting surface N, which is formed corresponding to the first mounting surface M.

A battery terminal 22 is disposed at the second mounting surface N corresponding to the battery connecting terminal 19. With the second mounting surface N being top surface of the battery 21 and the battery terminal 22 positioned on the top surface of the battery 21, the battery 21 is slid forward, a direction along the first mounting surface M, to be mountable to the battery mounting portion 20. When the battery 21 is mounted to the battery mounting portion 20, the second mounting surface N faces the first mounting surface M and faces upward. Additionally, the battery terminal 22 is electrically connected to the battery connecting terminal 19 of the battery mounting portion 20. The battery 21 is an electric power supply source for the power unit 3.

The battery 21 includes a battery nail 23 coordinating with a battery lever (not illustrated), which is disposed to be movable downward partially exposed with the rear portion biased to the upper side. The battery mounting portion 20 includes a battery nail receiving portion 24, which is depressed upward and receives the battery nail 23 at the mounting of the battery 21, at the rear portion. The battery lever is lowered to separate the battery nail 23 from the battery nail receiving portion 24 and is slid rearward to remove the battery 21 from the battery mounting portion 20.

A plate-shaped controller 25 thinned in a vertical direction compared with the front to rear and the right to left is disposed on the upper side of the battery mounting portion 20. The controller 25 expands from side to side and back and forth and has a posture along the second mounting surface N of the battery 21 mounted to the battery mounting portion 20. The controller 25 is electrically connected to the battery 21 mounted to the battery mounting portion 20 via the battery terminal 22 to the battery connecting terminal 19. The controller 25 houses a control circuit board 25a with a posture similar to the controller 25.

The controller 25 is disposed at a position similar to a part of (the rear portion) of the handle Q in the front-rear direction and overlaps with the handle Q in the top view.

To the battery mounting portion 20, a battery 21 (not illustrated) with a capacity larger than the illustrated battery 21 is also slidably mountable. The large-capacity battery 21 also has the second mounting surface N and the battery terminal 22. The large-capacity battery 21 is mounted such that the second mounting surface N is the top surface of the battery 21 and faces the first mounting surface M.

The large-capacity battery 21 and the illustrated battery 21 (a battery for electric power tool) are formed to have dimensions in the front-rear direction (the longitudinal direction) in the illustrated state of the battery 21 to be equivalent sizes to one another as much as possible and the dimensions in the right-left direction and in the vertical direction (the thickness direction) to be different sizes from one another according to the sizes of the capacities. That is, the large-capacity battery 21 has the size similar to the illustrated battery 21 in the front-rear direction and has the sizes larger than the illustrated battery 21 in the right-left direction and in the vertical direction (especially the latter).

A switch 26 is disposed inside the handle portion 18, and a trigger 27 to switchingly operate the switch 26 is coupled to the switch 26. The lower portion of the trigger 27 is exposed from the lower portion of the handle portion 18 downward.

Additionally, at the left of the switch 26, a button type lock-on switch 28 is disposed. A button portion of the lock-on switch 28 is exposed from a left surface of the left housing 15 on the upper side of the trigger 27 of the handle portion 18.

Further, at the front upper of the housing 2 (the housing base portion 17 at the front of the front end of the handle portion 18), a button switching type standby switch 29 is disposed. A button portion of the standby switch 29 is exposed at the top surface of the housing 2.

Additionally, a speed adjustment dial 30 is disposed at the left upper side of the battery mounting portion 20 at the rear portion of the housing base portion 17 and on the lower left side at the rear lower end of the handle portion 18 in a state of partially exposed from the housing 2.

The power unit 3 includes an electric (DC) motor 32 disposed at the inside of the center part of the housing base portion 17.

The motor 32 is disposed in front of the battery mounting portion 20 and the battery 21. The battery 21 mounted to the battery mounting portion 20 is disposed at a height similar to the motor 32 in the vertical direction and overlaps with the motor 32 in the front view. Additionally, the battery 21 mounted to the battery mounting portion 20 is disposed at a position similar to a part of (the rear portion) of the handle Q in the front-rear direction and overlaps with the handle Q in the top view.

The motor 32, the switch 26, the lock-on switch 28, the standby switch 29, and the speed adjustment dial 30 are electrically connected to the controller 25 (the control circuit board 25*a*) with a lead wire (not illustrated) (includes a connector as necessary). The controller 25 (the control circuit board 25*a*) controls driving of the motor 32.

The motor 32 is a brushless motor and includes a rotor 33, which rotates around the axis, and a stator 34, which is fixed to the housing 2.

The rotor 33 includes a motor shaft 35, which is a rotation shaft of the motor 32, a rotor core 36, and a plurality of (4 pieces of) magnets 37, which are disposed integrally with the motor shaft 35 at the center part of the motor shaft 35.

Teeth are formed at the front end portion of the motor shaft 35.

A front bearing (a ball bearing) 38 rotatably supports the front portion of the motor shaft 35. A rear bearing (a ball bearing) 39 rotatably supports the rear end portion of the motor shaft 35.

The front bearing 38 is held to the housing 2 via a bearing case 40, and the rear bearing 39 is held to the housing 2.

Figure 11:
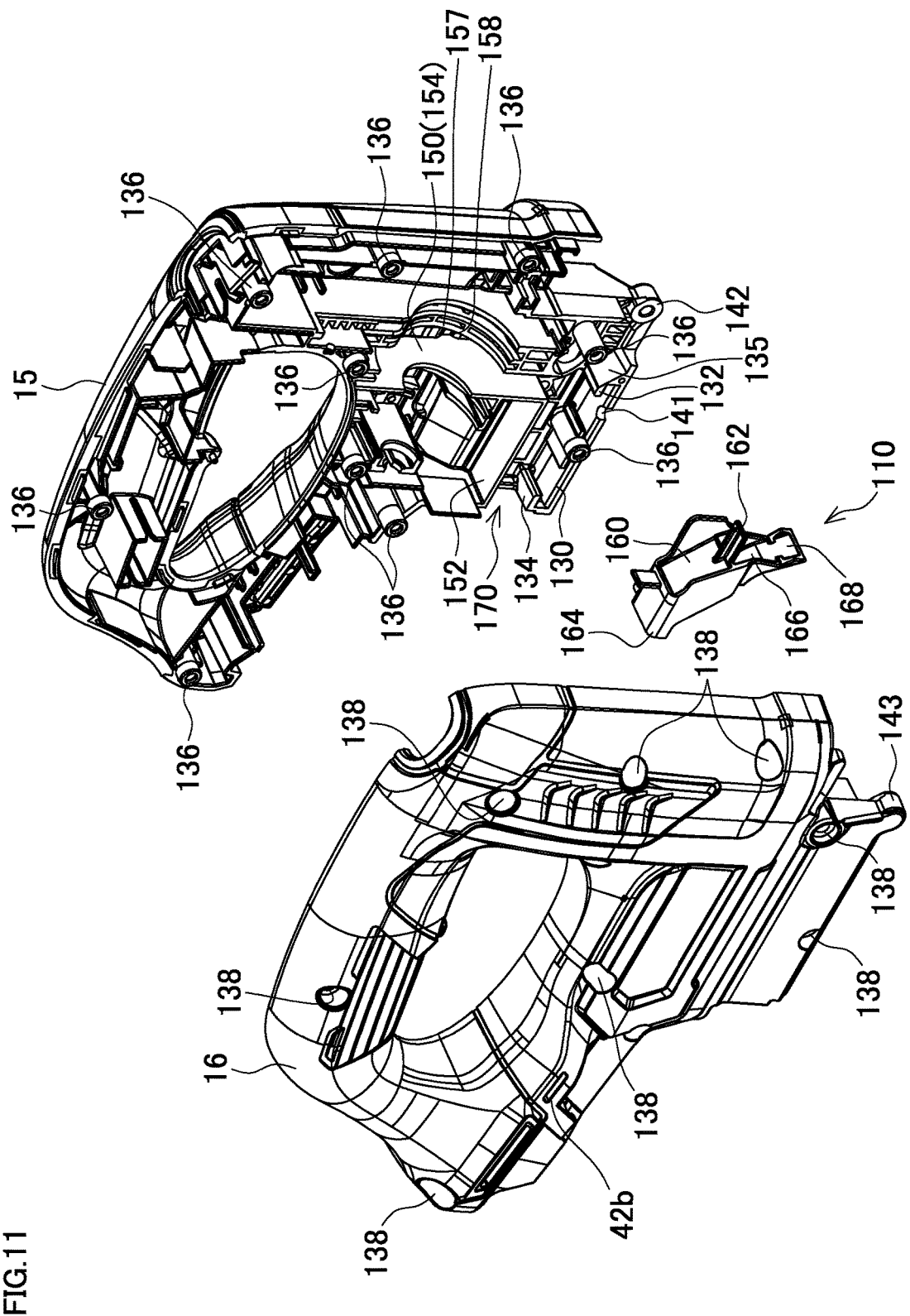
FIG. 11 is a perspective view of a left housing, a right housing, and a guiding member in FIG. 3.

At the rear side of the front bearing 38, a centrifugal fan 41, which extrudes air to outside in a radial direction through the rotation, is fixed to the motor shaft 35. A plurality of cooling air intake ports 42*a* with a slit shape in the front-rear direction are bored at the rear (the rear side of the rear bearing 39) part of the motor 32 in the left housing 15 mutually aligned in the vertical direction. A cooling air intake port 42*b* with a slit shape in the front-rear direction is bored at the side portion of the battery mounting portion 20 in the right housing 16 (FIG. 11).

The controller 25 is disposed with a posture along an imaginary straight line X (FIG. 3) passing through the centrifugal fan 41 and the cooling air intake port 42*b*.

The stator 34 includes a tubular stator core 43, which has the axial direction in the front-rear direction, a disk-shaped first insulating member 44, which is disposed on the front side of the stator core 43, a disk-shaped second insulating member 45, which is disposed at the rear side and the inside of the stator core 43, and a plurality of (here, 6 pieces of) coils 46, 46, and so on, which are wound around the stator core 43 via the first insulating member 44 and the second insulating member 45.

A circular plate-shaped sensor substrate 47 is installed at the rear side of the second insulating member 45 by insertion of a screw 48 into the second insulating member 45. A hole through which the motor shaft 35 passes is bored at the center part of the sensor substrate 47. The sensor substrate 47 includes a plurality of (here, 3 pieces of) rotation detecting elements (not illustrated) as rotation detecting sensors to detect a rotation position of the rotor 33. The rotation detecting elements are magnetic sensors and disposed so as to be mutually disposed at regular intervals in a circumferential direction at the upper portion of the front surface of the sensor substrate 47.

The coils 46, 46, and so on are electrically connected to one another in a predetermined connection aspect (delta connection) and further are electrically connected to the controller 25 via a terminal portion 49.

The controller 25 includes a switching element (not illustrated) that sequentially switches electric power supply to the respective coils 46 on the stator 34 in a predetermined aspect. With the switch 26 on, the controller 25 obtains a rotating state of the rotor 33 from the sensor substrate 47 and transmits a control signal by a control circuit formed of a microcomputer according to the rotating state of the rotor 33, and rotates the rotor 33 via the magnets 37 such that a driving circuit formed of the switching element causes a current to flow through the respective coils 46 in order.

Further, the controller 25 includes an auto-stop circuit (not illustrated) that cuts off the electric power supply to the motor 32 so as not to cause excessive discharge or overcurrent according to the detection result of the battery 21 state.

The power transmission unit 4 includes an intermediate gear 50, a support shaft 51 in the front-rear direction passing through the center part of the intermediate gear 50, and a guiding roller 54. The guiding roller 54 is disposed so as to project forward from the peripheral edge portion of the front surface of the intermediate gear 50 via a shaft 52 and a bearing (a needle bearing) 53.

The intermediate gear 50 is disposed on the upper side of the motor shaft 35 and is rotatably supported to the support shaft 51. Bearings (needle bearings) 55 and 55 are interposed between the intermediate gear 50 and the support shaft 51. The bearings 55 and 55 are arranged back and forth, the rear end abuts on the front surface of the bearing case 40, and the front end is pressed by a circlip 56.

The intermediate gear 50 integrally includes a teeth portion 60, a counter weight cam portion 61, and a push plate cam portion 62 in order from the front.

The teeth portion 60 has a disk shape and has teeth meshing with teeth at a distal end portion of the motor shaft 35 on the outer periphery.

The counter weight cam portion 61 has a disk shape with a diameter smaller than the teeth portion 60 and is eccentrically disposed on the rear surface side of the teeth portion 60.

The push plate cam portion 62 has a disk shape with a diameter smaller than the counter weight cam portion 61 and is eccentrically disposed with respect to the teeth portion 60 on the rear surface side of the counter weight cam portion 61.

Since the diameter (the number of teeth) of the teeth portion 60 of the intermediate gear 50 is larger than the diameter (the number of teeth) of the motor shaft 35 of the motor 32, the rotation of the motor shaft 35 is decelerated by the intermediate gear 50.

The front end portion of the support shaft 51 is supported to the housing 2, and the rear end portion is inserted into a hole in the front-rear direction formed on the bearing case 40 (above the front bearing 38). The support shaft 51 passes through a center of the teeth portion 60.

The guiding roller 54 is mounted to a position eccentric with respect to the rotational center of the teeth portion 60 of the intermediate gear 50.

The guiding roller 54 is eccentric to a side opposite to the counter weight cam portion 61 and the push plate cam portion 62 of the intermediate gear 50. That is, the guiding roller 54 is disposed so as to have an angle of 180° with the counter weight cam portion 61 and the push plate cam portion 62 in a rotation direction of the teeth portion 60.

The shaft 52 of the guiding roller 54 is mounted to the peripheral edge portion of the intermediate gear 50 so as to project forward from the front portion and is rotatably supported by the bearing 53.

The slider 8 receives the guiding roller 54 such that the guiding roller 54 can reciprocate to the right and the left and receives the power from the power unit 3 transmitted via the power transmission unit 4 for vertical motion.

The slider 8 includes a slider body 69. The slider body 69 is a plate-shaped member expanding from side to side and up and down.

The slider body 69 has a hole portion 70 extending in the right-left direction at the center part, and the guiding roller 54 is inserted into the hole portion 70. The guiding roller 54 rotates at the hole portion 70 on the slider body 69 to be movable along the hole portion 70.

When the rotation of the intermediate gear 50 displaces (revolves) the guiding roller 54, a displacement component of the guiding roller 54 in the vertical direction is transmitted to the slider body 69. Accordingly, the slider body 69 vertically moves via the guiding roller 54. Since the guiding roller 54 rotates in the hole portion 70 on the slider body 69 and reciprocates to the right and the left, the displacement component of the guiding roller 54 in the right-left direction through revolution is not transmitted to the slider body 69.

Additionally, the slider 8 includes a tubular blade guide 71 with a thin hole, which receives the upper end portion of the blade 6 at the lower end portion, and a blade clamp 72 and a plate 73, which sandwich the upper end portion of the blade guide 71 from the front and the rear.

The blade guide 71 receives the blade 6 at the thin hole to hold the blade 6.

A spring 74 as an elastic body is inserted into the upper end portion of the thin hole on the blade guide 71 to allow a swing of the blade 6 pressed in the front-rear direction by the orbital motion mechanism 10 while the blade 6 is held by the blade guide 71.

The blade clamp 72 and the plate 73 are secured to one another in the state of sandwiching the slider body 69 and the blade guide 71 to couple the slider body 69 to the blade guide 71. The blade clamp 72, the plate 73, and the blade guide 71 holding the blade 6 vertically move together with the slider body 69.

A column-shaped slider guide 75 having a slit at the center is disposed adjacent to the upper portion of the slider body 69. The upper portion of the slider body 69 (a part upward with respect to the hole portion 70 and the size (the width) in the right-left direction is smaller than the hole portion 70) is inserted into the slit of the slider guide 75. The slider guide 75 is mounted to the housing 2.

Additionally, adjacent to the lower portion of the slider body 69, a cylindrical-shaped slider support 76 and a ring-shaped sealing member 78, which is disposed at the lower side of the slider support 76, are disposed. The slider support 76 and the sealing member 78 are each mounted to the housing 2.

The slider support 76 is disposed downward with respect to the motor shaft 35 and has a center hole into which the lower portion of the slider body 69 is inserted.

The sealing member 78 is an elastic body (a sponge made of a polyurethane) and has a center hole into which the lower portion of the slider body 69 is inserted. The sealing member 78 is disposed upward with respect to a top dead center (an upper end in a range of the vertical motion, the state illustrated in each drawing) of the blade guide 71.

A guard 79, which is made of a wire, bent into a U shape in the front view and extending in the vertical direction is disposed in front of the blade guide 71 and the blade 6. The upper end portion of the guard 79 is supported by the housing 2. FIG. 2 omits the guard 79.

The orbital motion mechanism 10 includes a push plate 80, a roller holder 82, a switching lever 84, and a back roller 86. The push plate 80 vertically moves in conjunction with the push plate cam portion 62 of the intermediate gear 50. The roller holder 82 is disposed at the lower side of the push plate 80. The switching lever 84 is disposed on the upper side of the roller holder 82. The back roller 86 is rotatably supported to the roller holder 82 via a shaft 85.

The push plate 80 is a plate-shaped member expanding from side to side and up and down. The push plate 80 has a hole with a size equivalent to the push plate cam portion 62 at the upper portion. The push plate cam portion 62 is inserted into this hole, that is, the push plate 80 is coupled to the push plate cam portion 62 at the upper portion. When the intermediate gear 50 rotates, the push plate cam portion 62 rotatably moves, and the push plate 80 also rotatably moves around the hole on the upper portion (the vertical motion and the lateral movement). Since the push plate cam portion 62 has a comparatively small amount of eccentricity, the amount of movement of the push plate 80 is also comparatively small.

The roller holder 82 includes a pair of plate-shaped hold portions 87 and 87, which bend forward and have a J shape in the side view, and an arm piece 88 extending rearward from the upper portions of the hold portions 87 and 87 in common. The roller holder 82 is swingably supported at the upper end portion of the hold portion 87 by a pin 89. The pin 89 is fixed to the housing 2. The back roller 86 is disposed at the lower front portion of the hold portion 87. Further, the lower end portion of the push plate 80 can be in contact with the upper side of the arm piece 88. The vertical motion of the push plate 80 repeatedly presses the arm piece 88 by the lower end portion of the push plate 80 to swing the roller holder 82 around the pin 89.

The switching lever 84 includes a semicircular column-shaped switching lever body portion 90 and a switching lever operating portion 91. The switching lever body portion 90 extends in the right-left direction and is disposed in the housing. The switching lever operating portion 91 is coupled to the left end of the switching lever body portion 90 and exposed from the housing 2. When the switching lever 84 is operated such that the curved surface of the switching lever body portion 90 becomes the lower (the planar surface becomes the upper), the curved surface contacts the upper portion of the arm piece 88, thus restricting the roller holder 82 so as not to swing. Meanwhile, when the switching lever 84 is operated such that the curved surface of the switching lever body portion 90 becomes the upper (the state of FIG. 3 and FIG. 4), the switching lever body portion 90 is away from the upper portion of the arm piece 88 and allows the roller holder 82 to swing.

The back roller 86 is rotatable along the rear side of the blade 6 and can press the blade 6 from the rear.

When the switching lever 84 is switched so as to allow the roller holder 82 to swing, since the mounting positions of the push plate cam portion 62 and the guiding roller 54 are eccentric in the opposite sides, the slider 8 moves up and the push plate 80 moves down and the back roller 86 swings forward via the roller holder 82. When the slider 8 moves down, the push plate 80 elevates and the back roller 86 returns from a swing advance position to a swing start position rearward. Accordingly, the back roller 86 presses the blade 6 forward in accordance with the elevation of the blade 6 and does not press the blade 6 during the descent of the blade 6 and causes the blade 6 to perform the orbital motion.

The counter weight 12 includes a balance plate 100, which vertically moves in conjunction with the counter weight cam portion 61 of the intermediate gear 50.

The balance plate 100 is a plate-shaped member thicker than the push plate 80, expanding from side to side and up and down, and disposed on the front side of the push plate 80. A bulging portion 101 bulging forward is formed at the upper portion of the balance plate 100. The weight of the balance plate 100 increases by the amount (at the upper portion in a direction opposite to the blade 6 disposed downward).

The center part of the balance plate 100 is interposed between the teeth portion 60 of the intermediate gear 50 and the push plate 80, and the push plate 80 is interposed between the balance plate 100 and the bearing case 40.

The balance plate 100 has a cam hole portion 102 at the center part. The lateral size of the cam hole portion 102 is configured to the extent with which the rotatable movement (the movement in the right-left direction) of the counter weight cam portion 61 is allowed. That is, even if the maximum eccentric part of the counter weight cam portion 61 is at the left (the right), the counter weight cam portion 61 has the size with which the counter weight cam portion 61 can be positioned in the cam hole portion 102.

When the intermediate gear 50 rotates and the counter weight cam portion 61 is displaced, the displacement component of the counter weight cam portion 61 in the vertical direction is transmitted to the cam hole portion 102 to vertically move the balance plate 100. By the sliding of the counter weight cam portion 61 inside the cam hole portion 102, the displacement component of the counter weight cam portion 61 in the right-left direction is not transmitted to the balance plate 100.

The weight of the balance plate 100 is configured as follows. That is, the weight of the balance plate 100 and the weights of the blade 6 and the slider 8 are configured to be balanced.

The mounting positions of the counter weight cam portion 61 and the guiding roller 54 are eccentric to the opposite sides. Accordingly, when the slider 8 moves up, the balance plate 100 moves down (the state illustrated in the drawing), and when the slider 8 moves down, the balance plate 100 moves up. Thus, the slider 8 and the balance plate 100 vertically move in the opposite directions to one another (phases different by) 180°. Therefore, the slider 8 and the balance plate 100 vertically move so as to have a symmetrical positional relationship based on the horizontal surface in the middle of these members. The bulging portion 101 of the balance plate 100 is disposed on the upper side, the side opposite to the blade 6, thus adjusting the weight balance of the balance plate 100.

The weights of the slider 8 and the blade 6 and the weight of the counter weight 12 are substantially equivalent.

From these points, the vibration generated by the vertical movement of the slider 8 is offset and reduced by the vertical movement of the balance plate 100 (the counter weight 12).

A guiding member 110 to guide the air is disposed at the lower portion on the front side of the housing 2. A base holder 112 as a fastening member for fixing the base 14 is disposed at the rear side.

Figure 12:
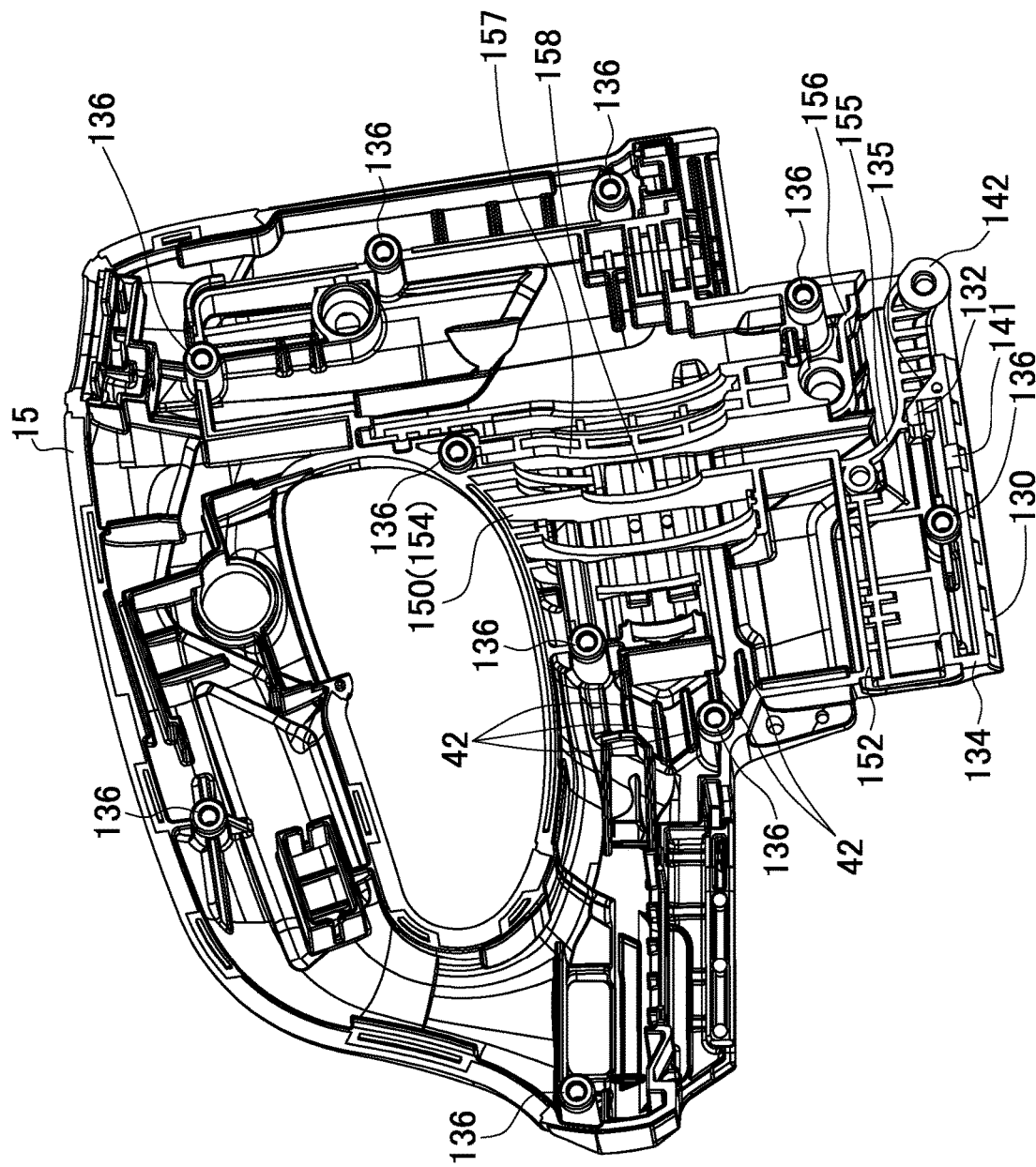
FIG. 12 is a perspective view of the left housing in FIG. 11.
Figure 13A:
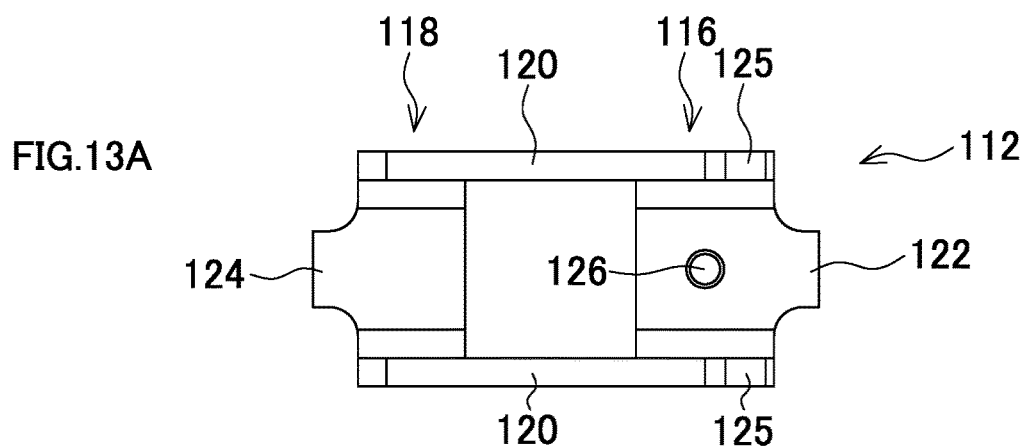
FIG. 13A is a top view.
Figure 13B:
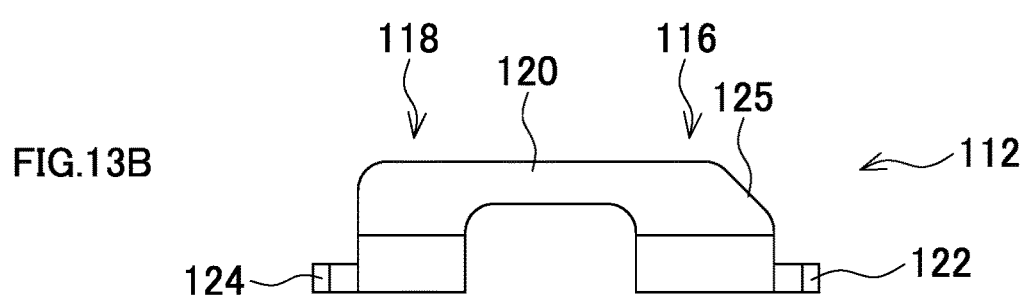
FIG. 13B is a right side view.
Figure 13C:
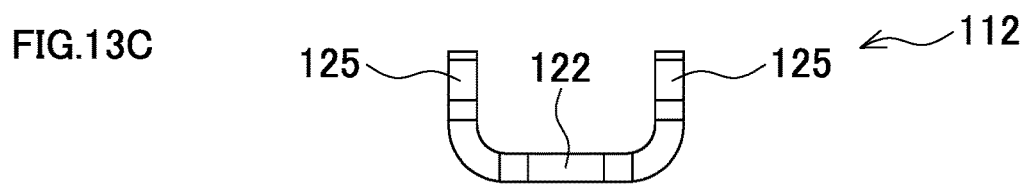
FIG. 13C is a front view.
Figure 13D:
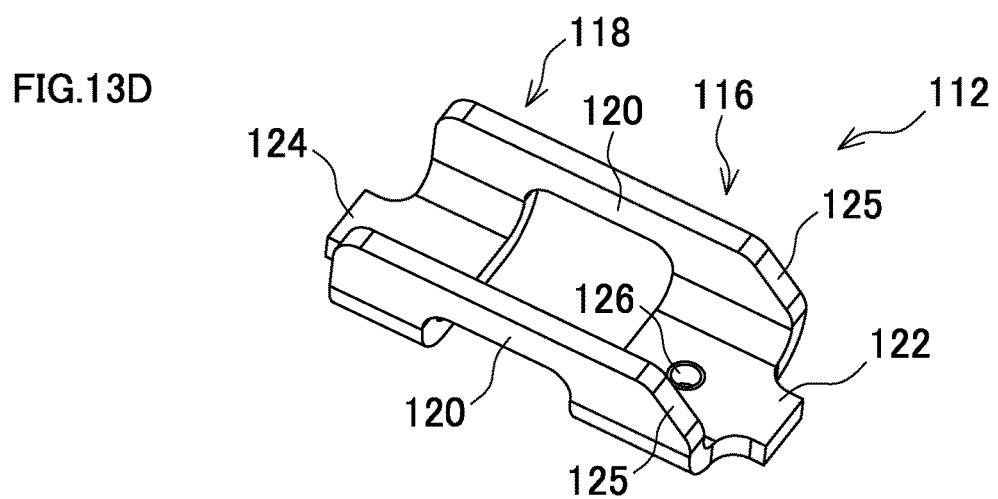
FIG. 13D is a perspective view of a base holder in FIG. 3.
Figure 14:
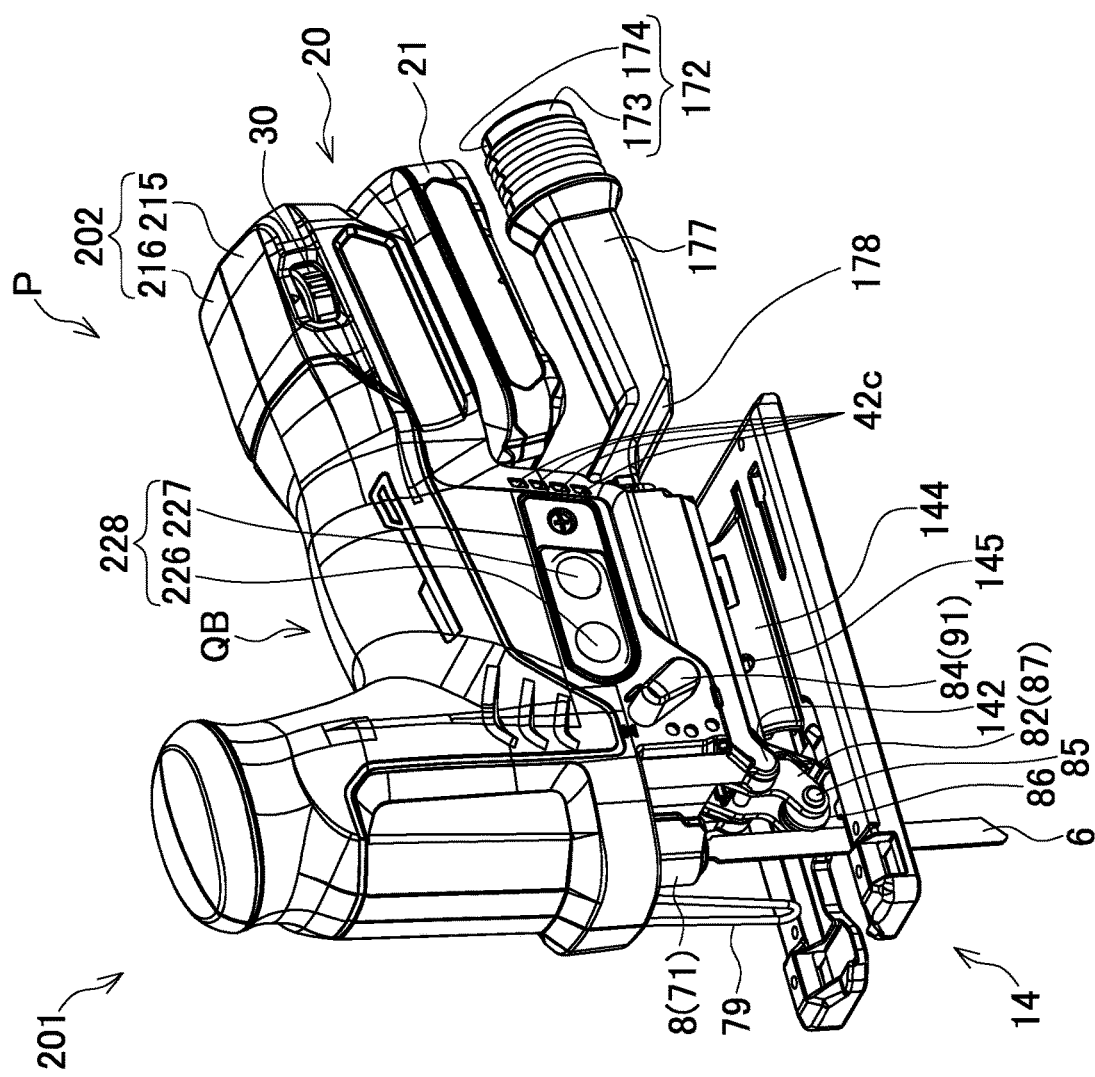
FIG. 14 is a perspective view of a jigsaw according to a second embodiment of the disclosure.
Figure 15:
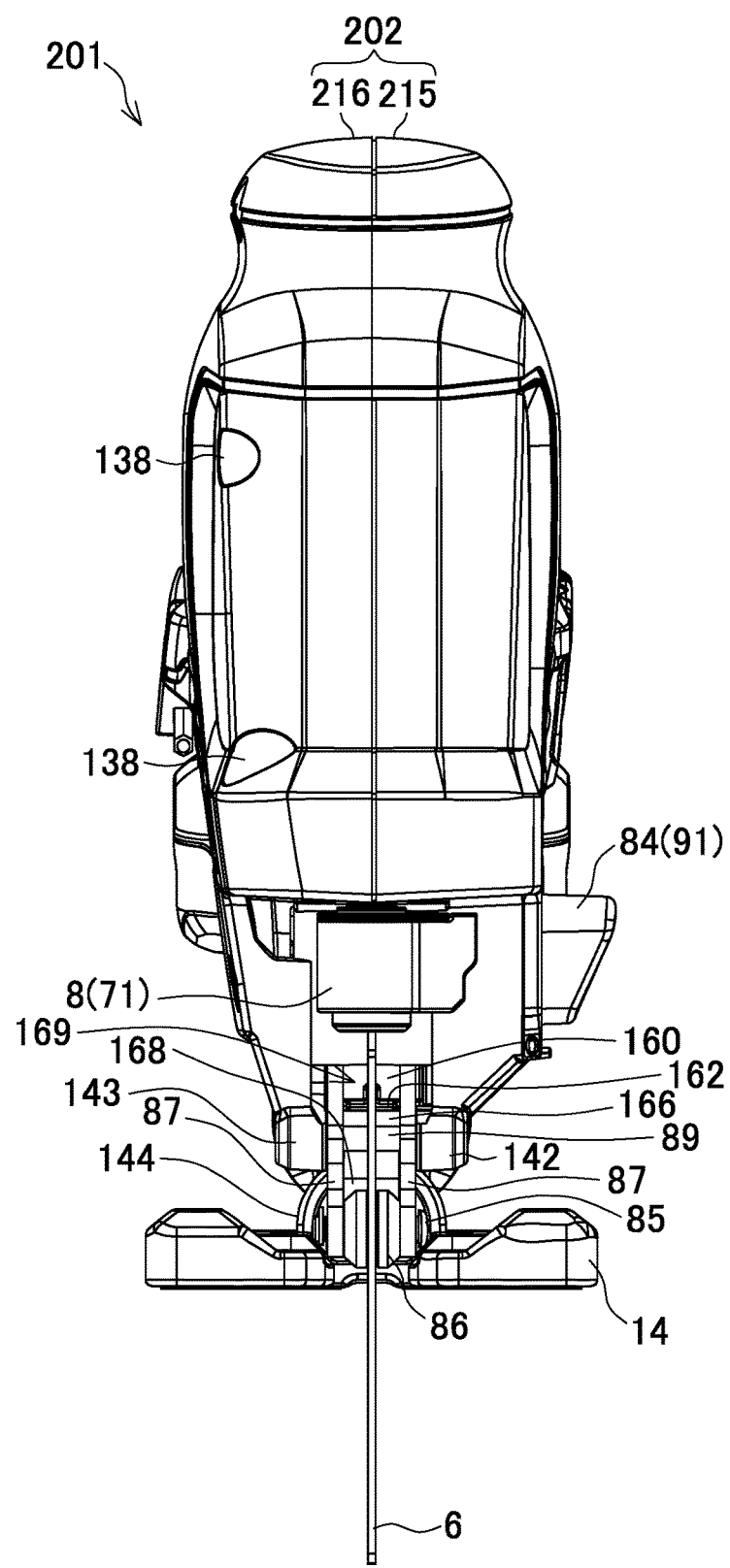
FIG. 15 is a front view of FIG. 14.
Figure 16:
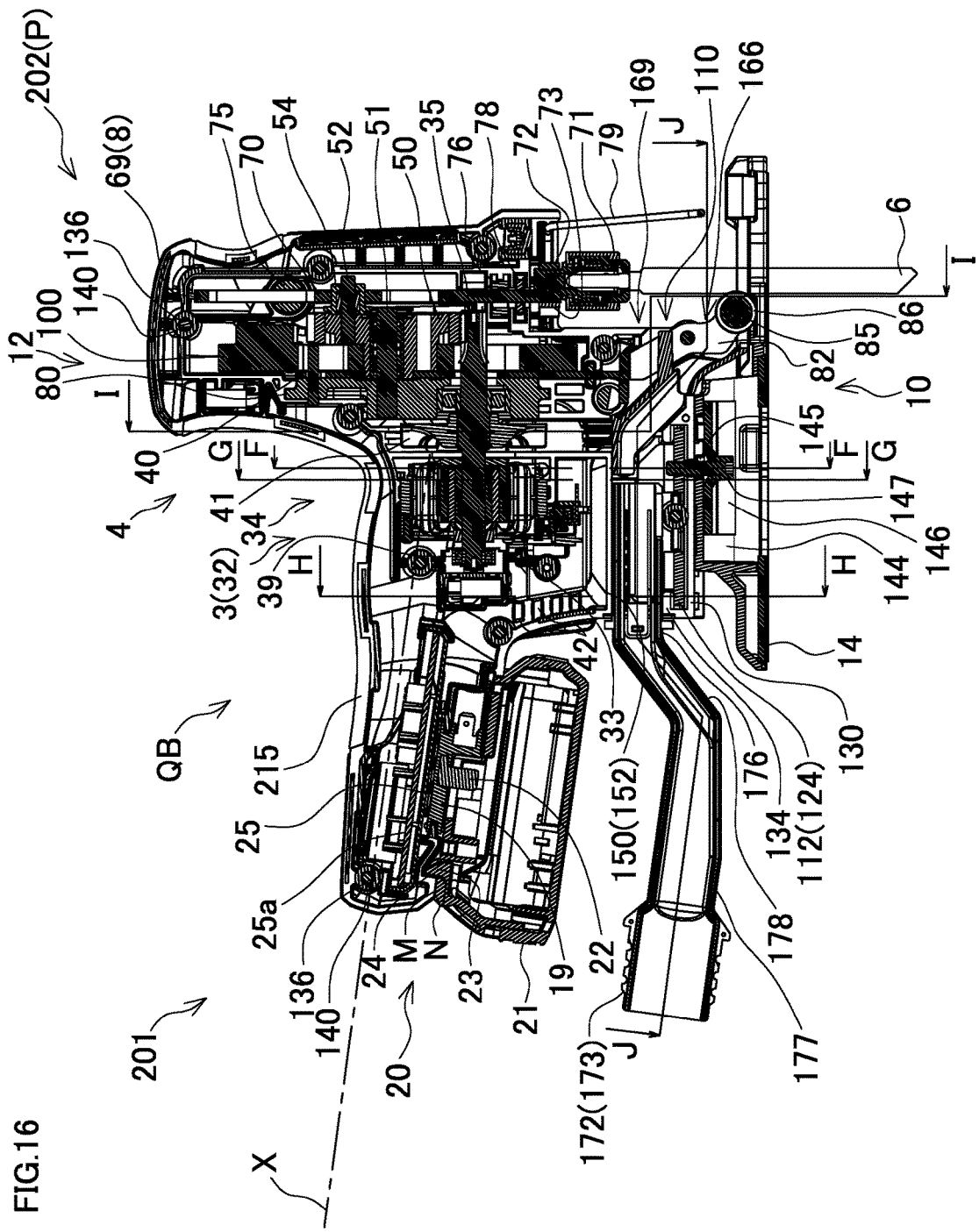
FIG. 16 is a center vertical cross-sectional view of FIG. 14.
Figure 17:
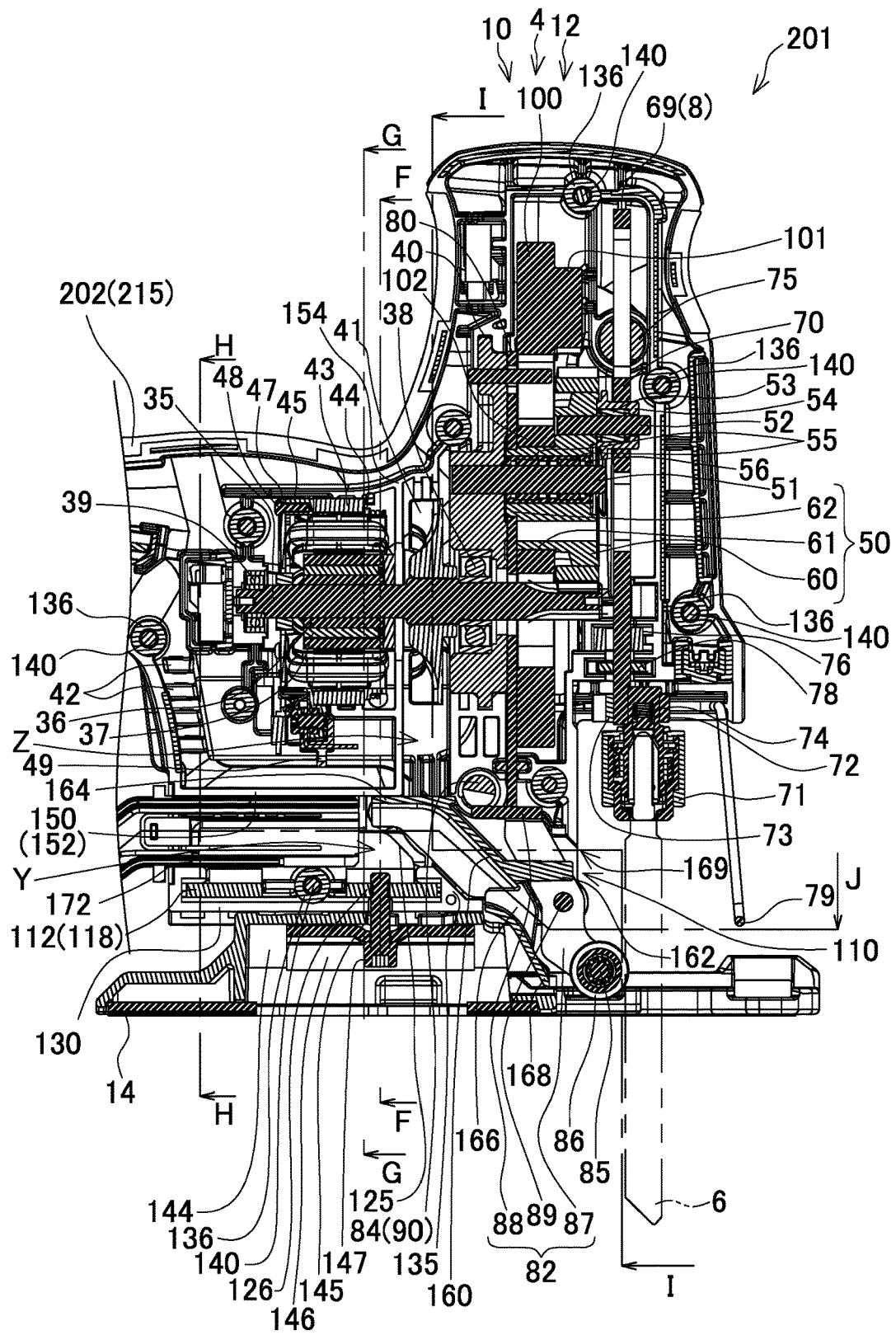
FIG. 17 is a front enlarged view of FIG. 16.
Figure 18:
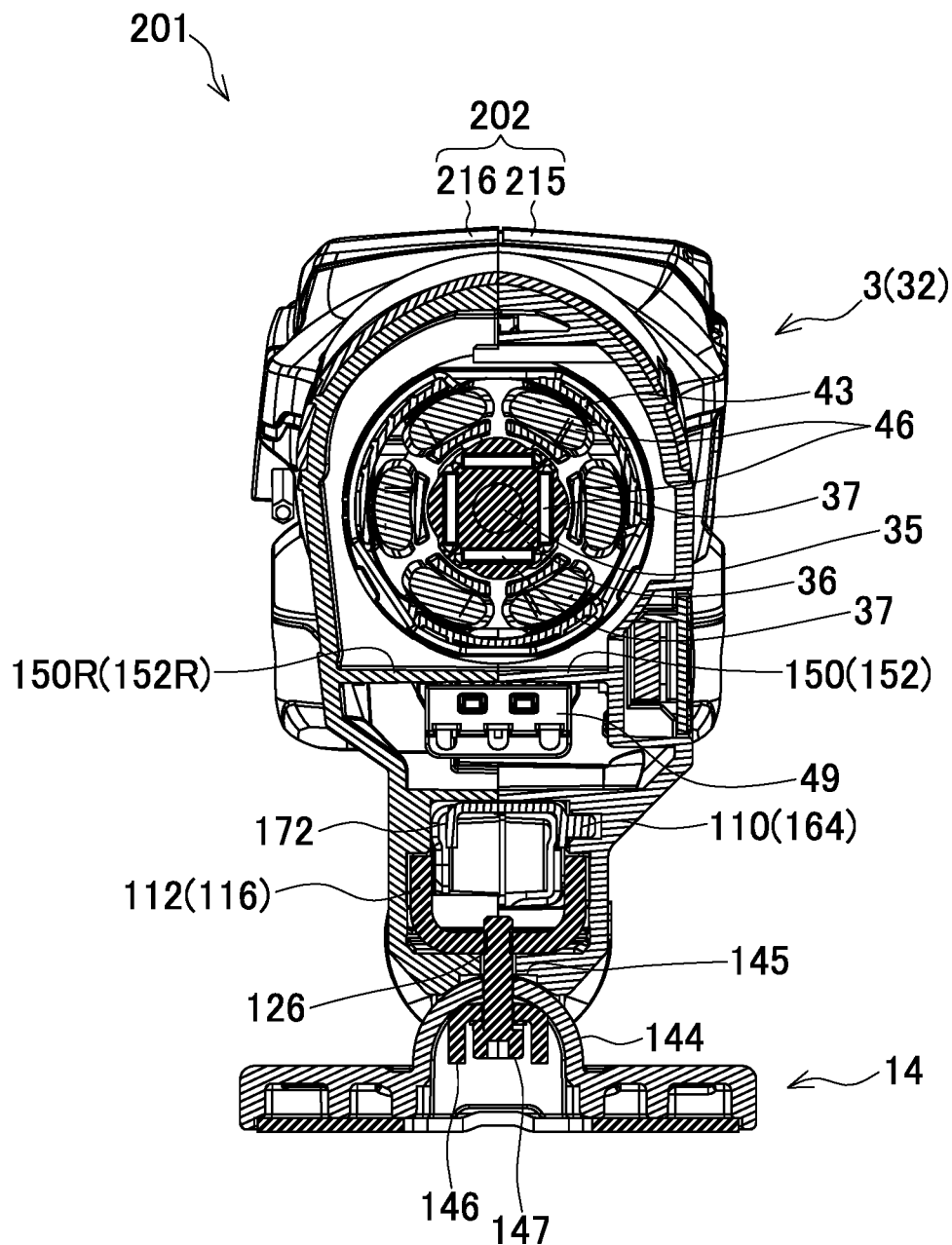
FIG. 18 is a cross-sectional view taken along the line F-F in FIG. 16.
Figure 19:
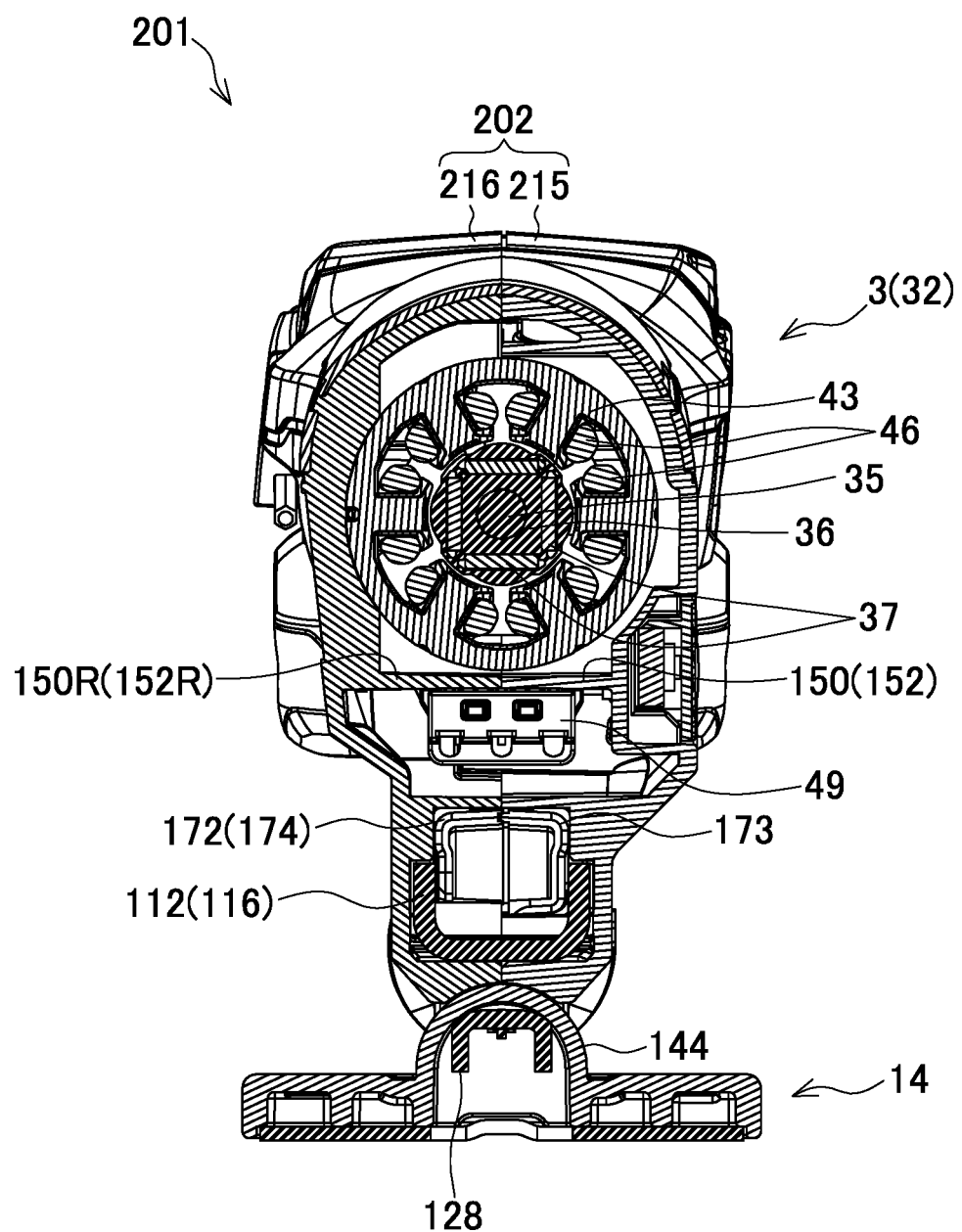
FIG. 19 is a cross-sectional view taken along the line G-G in FIG. 16.
Figure 20:
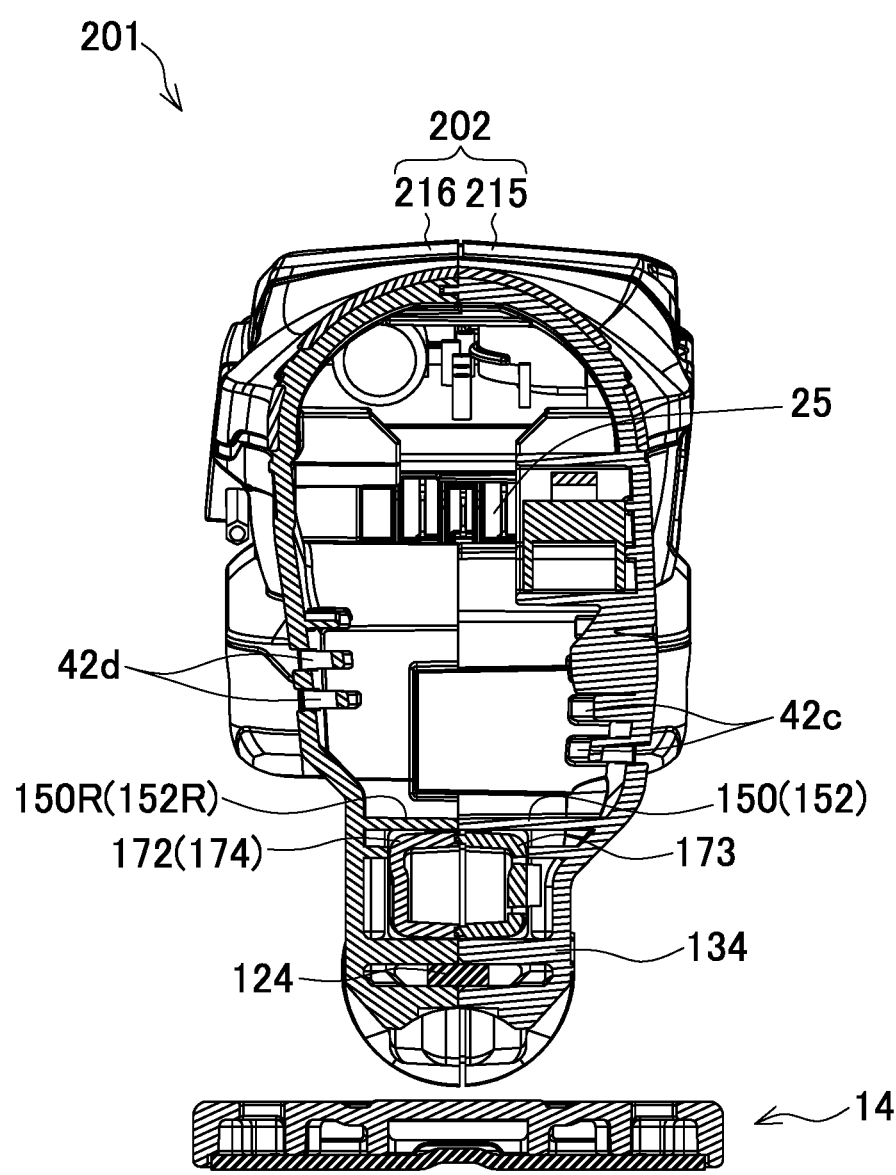
FIG. 20 is a cross-sectional view taken along the line H-H in FIG. 16.
Figure 21:
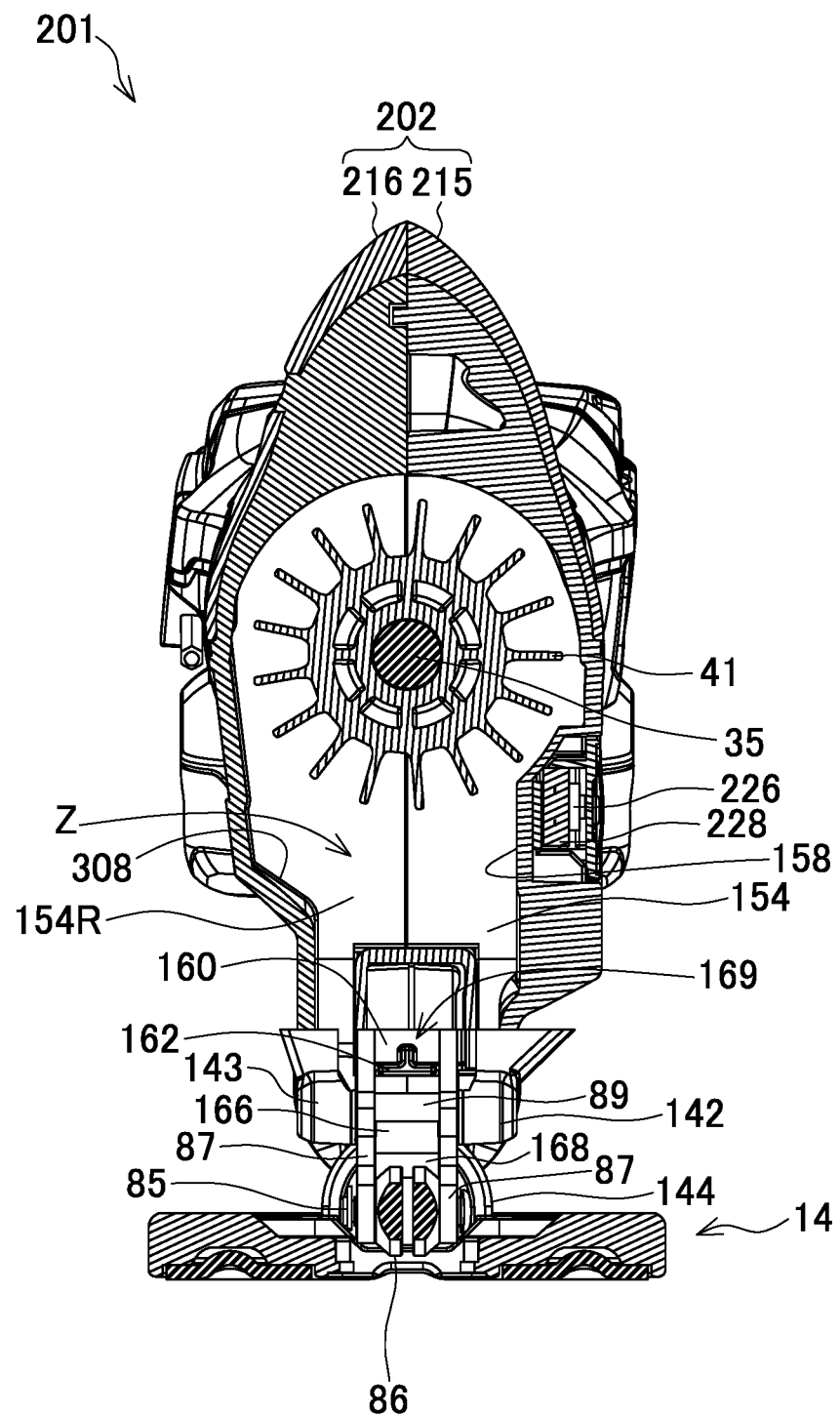
FIG. 21 is a cross-sectional view taken along the vertical line I-I in FIG. 16.
Figure 22:
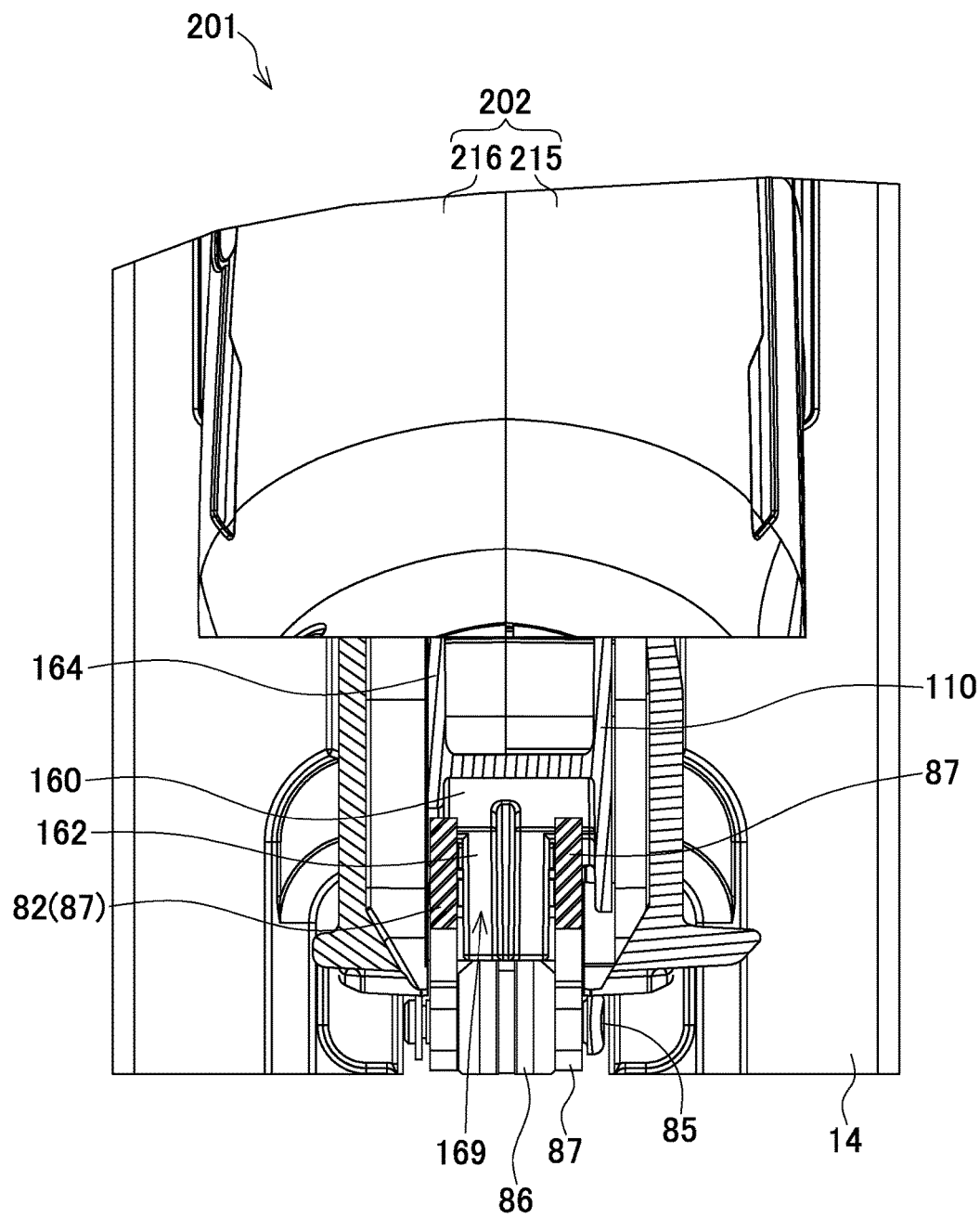
FIG. 22 is a cross-sectional view taken along the lateral line J-J in FIG. 16.
Figure 23:
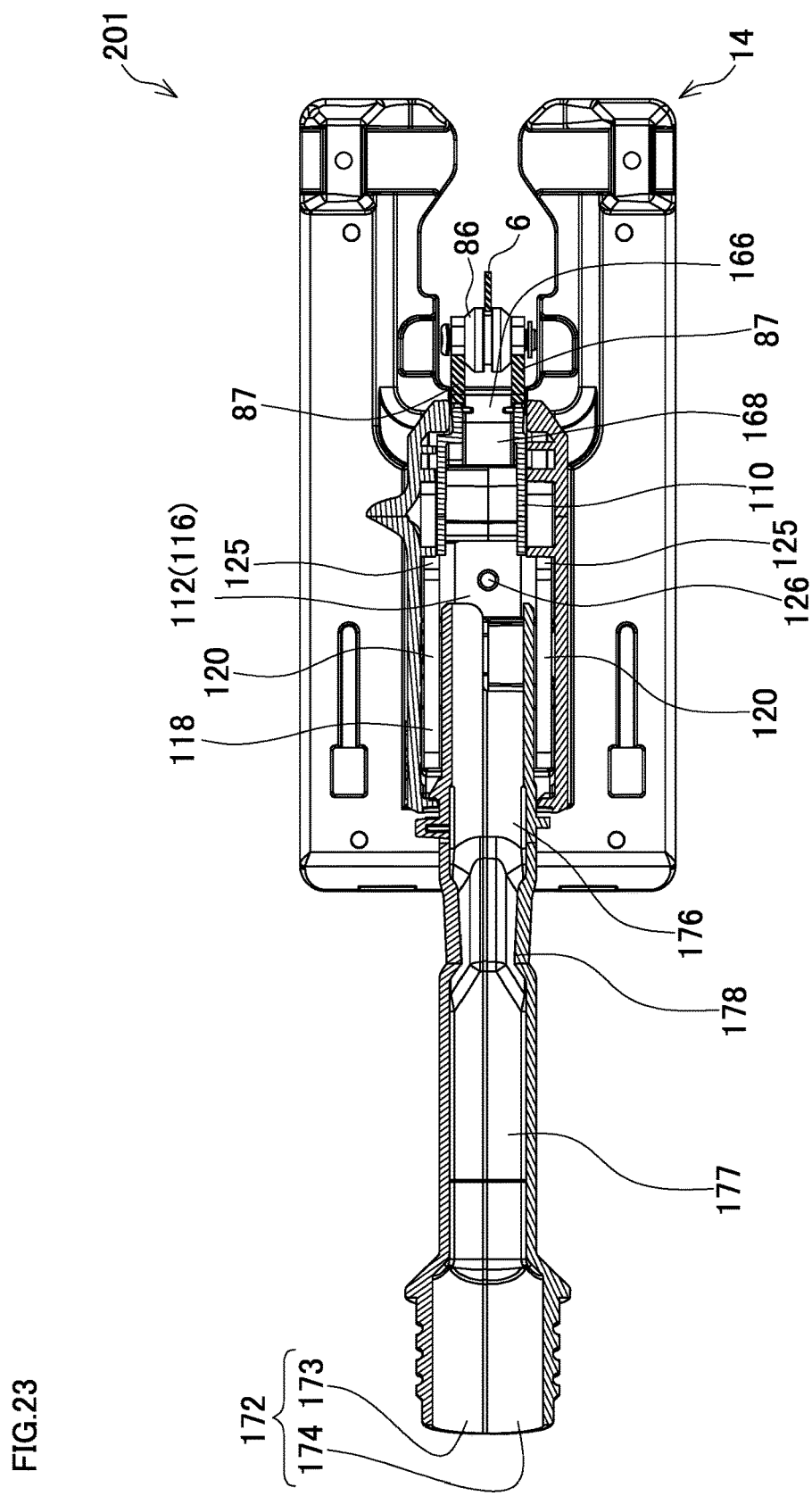
FIG. 23 is a cross-sectional view taken along the line K-K in FIG. 16.

FIG. 11 is a perspective view of the left housing 15, the right housing 16, and the guiding member 110, FIG. 12 is a perspective view of the left housing 15, and FIG. 13A is a top view, FIG. 13B is a right side view, FIG. 13C is a front view, and FIG. 13D is a perspective view of the base holder 112. The right of FIGS. 13A and 13B and the lower right of FIG. 13D correspond to the front side.

The base holder 112 has a U shape in the front view and a Ω shape in the side view and is made of a metal with conductive property.

At the center part of the base holder 112, joining portions 120 and 120 to join upper portions of a pair of standing walls of a front portion 116, which has a U shape in the cross-sectional surface, and a rear portion 118, which has a U shape in the cross-sectional surface, together are disposed. The right and the left parts of the front portion 116, the joining portions 120 and 120, and the rear portion 118 extending in the front-rear direction and standing in the vertical direction constitute standing portions. Between the front portion 116 and the rear portion 118 and between the joining portions 120 and 120 constitute a fastener overlap portion. The front portion 116 and the rear portion 118 of the base holder 112 have bent portions in the front-rear direction at the right and the left. The base holder 112 is formed by bending or narrowing (including a bead) parts to be the bent portions of the sheet metal.

The base holder 112 has a front small piece portion 122, which projects forward with respect to other parts, at the front side on the bottom portion of the front portion 116. The base holder 112 has a rear small piece portion 124, which projects rearward with respect to other parts, at the rear side on the bottom portion of the rear portion 118.

Inclined portions 125 and 125, which are chamfered and disposed downward to the front, are formed at the front upper portions of the pair of standing walls of the front portion 116 of the base holder 112.

A bolt hole 126 as a fastening hole is bored at the bottom portion of the front portion 116 of the base holder 112.

The base holder 112 is held in a left holder case portion 130, which projects rightward at the lower side portion of the left housing 15, and a right holder case portion (not illustrated), which similarly projects leftward at the lower side portion of the right housing 16. Hereinafter, the explanation on the left holder case portion 130 is true of the right holder case portion unless otherwise stated. Combining the left holder case portion 130 with the right holder case portion forms a holder case portion.

The left holder case portion 130 expands from side to side and back and forth and includes a front rib 132, which has an r shape in the side view and extends upward and rearward, at the front end portion, and a rear rib 134, which has an r shape in the side view and extends upward and forward, at the rear end portion. The front small piece portion 122 is inserted into the front rib 132 of the left holder case portion 130 (and the front rib of the right housing 16). The front small piece portion 122 contacts the front rib 132 and the lower portion at the front end portion of the top surface of the holder case portion (a front small piece receiving portion), and the front small piece receiving portion is disposed at the top and the bottom of the front small piece portion 122. Similarly, the rear small piece portion 124 is inserted into the rear rib 134 and the lower portion at the rear end portion of the top surface (a rear small piece receiving portion) of the holder case portion, and the rear small piece receiving portion is disposed at the top and the bottom of the rear small piece portion 124. The front portion of the front rib 132 is formed as an inclined portion 135 projecting forward as going downward. The inclined portion 135 is continuous with an extended line of the inclined portion 125 of the base holder 112.

Additionally, a plurality of screw bosses 136, 136, and so on are formed at the left housing 15. Screw holes 138, 138, and so on corresponding to the screw bosses 136, 136, and so on are formed at the right housing 16. The screw bosses 136 are disposed at parts where the left housing 15 and the right housing 16 are fixed to one another by inserting screws 140 into the stacked screw holes 138 and screw bosses 136, at the center upper side of the left holder case portion 130. The screw holes 138 are disposed at the center upper side of the right holder case portion. The screw bosses 136 are disposed on the lower side of the joining portion 120 of the base holder 112, and the base holder 112 has a shape so as to avoid the screw bosses 136.

At a part forward with respect to the screw bosses 136 in the left holder case portion 130, a left bolt hole 141 having a semicircular column-shaped space is formed. Mating the left bolt hole 141 with a right bolt hole, which is formed similarly in the right holder case portion, forms a bolt hole having a column-shaped space. The bolt hole 126 on the base holder 112 stacks on the upper side of the bolt hole.

While the standing portions of the base holder 112 are in contact with the inner surface of the housing 2 at the right and the left on the upper side of the holder case portion, a part of or all of the standing portions needs not to contact the inner surface of the housing 2.

A left pin supporting portion 142 to support the pin 89 of the roller holder 82 is formed in front of the front rib 132 of the left holder case portion 130 and the front lower corner portion of the left housing 15. Similarly, a right pin supporting portion 143 to support the pin 89 of the roller holder 82 is formed at the front lower corner portion of the right housing 16.

The base 14 is a plate-shaped member whose lower surface is approximately planar surface and includes a dome portion 144 bulging upward at the center part. The top surface of the dome portion 144 is formed on a semicylindrical surface having the axial direction in the front-rear direction. The dome portion 144 has the top surface rectilinear in the front-rear direction and bending in the right-left direction. At the center of the top surface of the dome portion 144, a slit portion 145 formed into a cross shape in the top view and extending from side to side and back and forth is formed.

The base 14 is fixed to the base holder 112 on the main body P side of the jigsaw 1 using a metallic clamp plate 146, which has an inversed U shape in the front view, and a bolt 147 (a fastener).

That is, with the clamp plate 146 disposed at the lower side of the slit portion 145 at the dome portion 144 of the base 14, the bolt 147 is inserted through the bolt hole 126 on the base holder 112 such that the bolt 147 is passed through the bolt hole formed at the center part of the clamp plate 146, the slit portion 145, the left bolt hole 141 on the left holder case portion 130 in the housing 2 and the right bolt hole, thus fastening the base 14 to the main body P. The periphery of the slit portion 145 of the dome portion 144 is sandwiched between the clamp plate 146 and the lower surface of the holder case portion of the housing 2, thus fixing the base 14 to the housing 2. The bolt 147 penetrates the housing 2 and the dome portion 144 of the base 14 and is inserted into the bolt hole 126 to present a tensile force in the axis direction of itself and fixes the base 14 to the main body P of the jigsaw 1 by the tension.

When the bolt 147 is passed through the part of the slit portion 145 in the front-rear direction, the posture of the main body P of the jigsaw 1 is vertical with respect to the base 14. Then, when the bolt 147 is passed through any given part in the front-rear direction, the main body P is slid back and forth with respect to the base 14.

Additionally, when the bolt 147 is passed at the left of the slit portion 145, the posture of the main body P of the jigsaw 1 is inclined to the left with respect to the base 14. When the bolt 147 is passed at the right of the slit portion 145, the posture of the main body P of the jigsaw 1 is inclined to the right with respect to the base 14.

That is, the main body P of the jigsaw 1 is fixable to the base 14 adjusting the relative position with respect to the base 14 in the front-rear direction and the inclination in the right-left direction, movable in the front-rear direction, and tiltable in the right-left direction.

The base holder 112 extends back and forth with respect to the bolt 147 passed through the bolt hole 126 on the front portion 116 of the base holder 112, especially extending to the rear.

In the case where the main body P of the jigsaw 1 is fastened to the base 14, the outer surfaces (the lower surface, the left surface, and the right surface) of the front portion 116 of the base holder 112 and the outer surfaces of the rear portion 118 serve as pressing surfaces to press the main body P (the holder case portion) of the jigsaw 1 to the base 14 (downward) by the base holder 112.

Additionally, the main body P and the base 14 have contact surfaces extending in the front-rear direction at the lower surface of the housing 2 and the top surface of the dome portion 144. A length (a sum of the front portion 116 and the rear portion 118) of the pressing surface of the base holder 112 in the front-rear direction is equal to or more than a half of the length of the contact surface of the main body P and the base 14 in the front-rear direction. Further, the bolt 147 penetrates the fastener overlap portion of the base holder 112, and the bolt 147 overlaps with the base holder 112 in the side view.

A lower surface 152 of a left motor case portion 150 is disposed between the base holder 112 and the motor 32 in the left housing 15. A right motor case portion 150R (FIGS. 5, 6, and 8) formed similarly in the right housing 16 is mated with the left motor case portion 150 to form a motor case portion.

The left motor case portion 150 has the lower surface 152 projecting inward and a front surface 154 extending upward from the front side portion of the lower surface 152. The right motor case portion 150R similarly has a lower surface 152R and a front surface 154R, and a part of the motor 32 is disposed in the motor case portion. The motor shaft 35 penetrates the front surfaces 154 and 154R. The centrifugal fan 41 and the front bearing 38 are disposed forward (outside of the motor case portion) with respect to the front surfaces 154 and 154R.

A lower left rib 155, which projects from the inner surface of the left housing 15 inward, is disposed from the lower side of the front surface 154 of the left motor case portion 150 to the upper side of the left pin supporting portion 142 in the left housing 15 through the upper side of the inclined portion 135 of the left holder case portion 130. The lower left rib 155 is lower than the front surface 154 in the right-left direction. The lower left rib 155 is formed into an arc shape downward to the front from the lower side of the front surface 154 to a part upper side of the inclined portion 135, and the arc-shaped part goes along the inclined portion 135. Further, a lower left-adjacent rib 156, which projects inward similar to the lower left rib 155, is formed at the upper side (the lower side of the switching lever body portion 90) of the lower left rib 155. The lower left-adjacent rib 156 has a predetermined interval and is opposed to the lower left rib 155 so as to go along the lower left rib 155. Similarly, a lower right rib 305 and a lower right-adjacent rib 306 (not illustrated) are formed at the right housing 16. The front surface of the standing portion on the left of the base holder 112 (the inclined portion 125 on the left of the front portion 116) is adjacent to the rear surface of the lower left rib 155.

Similarly, the inclined portion 125 on the right of the front portion 116 is adjacent to the rear surface of the lower right rib 305 (contact ribs).

A left bearing case holding rib 157 is formed in front of the front surface 154 of the left motor case portion 150 projecting inward (rightward) from the inner surface of the left housing 15 to hold the bearing case 40 and similarly, a right bearing case holding rib 307 (not illustrated) is formed at the right housing 16. These left bearing case holding rib 157 and right bearing case holding rib 307 form a bearing case holding portion.

The front surface 154 of the left motor case portion 150, the left bearing case holding rib 157, and a part between the front surface 154 and the left bearing case holding rib 157 are formed depressed outside in the right-left direction (leftward), forming the upper portion of a left groove portion 158 extending downward from a part where the centrifugal fan 41 is disposed. The lower portion of the left groove portion 158, which extends forward, is formed of the lower left rib 155, the lower left-adjacent rib 156, and the inner wall of the left housing 15 between the lower left rib 155 and the lower left-adjacent rib 156. Additionally, a right groove portion 308 is formed similarly at the right housing 16.

Further, the guiding member 110 is disposed in the lower portions of the left groove portion 158 and the right groove portion 308 and forward from the lower sides of the front portions of the lower surfaces 152 and 152R of the motor case portion so as to be continuous with the upper portions of the left groove portion 158 and the right groove portion 308.

The guiding member 110 includes an inclined surface 160, which projects forward as going downward, a partition portion 162, an air intake guiding portion 164, a dust collection air intake port 166, and an air intake port guiding portion 168. The partition portion 162, which has an inversed T shape in the front view, projects forward from the center of the lower portion of the inclined surface 160. The air intake guiding portion 164 projects rearward from the upper side, the left side, and the right side of the inclined surface 160 so as to surround the rear surface of the inclined surface 160. The dust collection air intake port 166 is open penetrating the lower sides of the partition portion 162 and the air intake guiding portion 164 in the front-rear direction. The air intake port guiding portion 168 is inclined similarly to the inclined surface 160 on the lower side of the dust collection air intake port 166.

The roller holder 82 is positioned on the front sides of the inclined surface 160 and the air intake port guiding portion 168. The partition portion 162 is inserted between the hold portions 87 and 87. The rear portion of the top surface of the air intake guiding portion 164 is in contact with the front portion of the lower surface of the motor case portion. The inclined right and left rear sides of the air intake guiding portion 164 face a direction similar to the inclined portion 125 of the base holder 112 and the inclined portion 135 of the front rib 132 of the holder case portion.

When the centrifugal fan 41 rotates by the rotation of the motor shaft 35, the extruded air flows downward between the left groove portion 158 and the right groove portion 308 (between the lower portions of the bearing case 40 and the push plate 80 and the front surfaces 154 and 154R of the motor case portion). The air goes through the upper side of the air intake guiding portion 164, the upper side (the front side) of the inclined surface 160, and the upper side of the partition portion 162 of the guiding member 110 and then is exhausted (the blower). The exhaust air wind is exhausted forward while the exhaust air wind is branched into the right and the left by the partition portion 162, which has the inversed T shape in the cross-sectional surface.

The left groove portion 158, the right groove portion 308, and the guiding member 110 form an exhaust passage Z. A part surrounded by the partition portion 162, the hold portions 87 and 87, and the arm piece 88 is an exhaust port 169, a part of (the lower portion) which is divided into the right and the left and opens forward.

A rear lower opening 170 is formed between the rear portion of the lower surface 152 of the left motor case portion 150 and the top surface of the rear rib 134 of the left holder case portion 130 (and a part of the right housing 16 formed similarly) in the housing 2. The distal end portion of a dust suction adapter 172 is insertable forward with respect to the rear lower opening 170.

The dust suction adapter 172 is coupled to a hose (not illustrated) of the dust collector to suction the air.

The dust suction adapter 172 is formed into a half tubular shape and includes a left dust suction adapter portion 173 and a right dust suction adapter portion 174.

The dust suction adapter 172 passes through the inside of the base holder 112, which has the U shape in the front view, to contact the base holder 112, and the distal end reaches the rear side of the air intake guiding portion 164 of the guiding member 110. The dust suction adapter 172 and the dust collection air intake port 166 of the guiding member 110 are communicated so as to ensure the flow of the air for dust collection by the rear surface of the inclined surface 160, the partition portion 162, and the air intake port guiding portion 168. A part from the distal end of the dust suction adapter 172 to the dust collection air intake port 166 forms an intake passage Y. The intake passage Y is coupled to the hose for dust collector via the dust suction adapter 172.

The dust suction adapter 172 is disposed below the battery 21 mounted to the battery mounting portion 20 and is removable by pulling out the dust suction adapter 172 from the rear lower opening 170.

The dust suction adapter 172 has a bent portion 178. The bent portion 178 connects a front portion 176 and a rear portion 177 of the dust suction adapter 172 such that the rear portion 177 is located at a lower side with respect to the front portion 176.

The following describes an operation example of the jigsaw 1.

The operator sets the blade 6 to the slider 8 in a stopped state such that the saw teeth comes to the front and the front portion of the lower surface of the base 14 is brought into contact with the workpiece. Then, with the battery 21 mounted to the battery mounting portion 20, when the handle portion 18 (the handle Q) is gripped and the switch 26 is turned on through the operation of the trigger 27, the controller 25 feeds the power to the motor 32 according to the state of the speed adjustment dial 30, the motor shaft 35 rotates at a velocity according to the state of the speed adjustment dial 30, and the rotating motor shaft 35 rotates the intermediate gear 50. With the lock-on switch 28 on, even if the trigger 27 is not operated and the switch 26 is off, the controller 25 feeds the power to the motor 32. With the standby switch 29 on, even if the trigger 27 is operated and the switch 26 turns on or the lock-on switch 28 is on, the controller 25 does not feed the power to the motor 32.

The rotation of the intermediate gear 50 vertically moves the slider 8 via the guiding roller 54. The rotation of the counter weight cam portion 61 of the intermediate gear 50 vertically moves the counter weight 12 (the balance plate 100). Further, the rotation of the push plate cam portion 62 of the intermediate gear 50 vertically moves the push plate

80. When the switching lever 84 is switched to a swing allowed position, the back roller 86 swings via the roller holder 82. These vertically movements and swing are performed by the number of times identical to one another (one time per rotation of the intermediate gear 50).

The swinging back roller 86 presses the blade 6 forward according to the elevation of the blade 6. The back roller 86 does not press the blade 6 at the descent of the blade 6 and causes the blade 6 to perform the orbital motion.

The slider 8 vertically moves with vibrations reduced by the counter weight 12 (the balance plate 100), which vertically moves symmetrically to the slider 8.

When the operator presses the handle Q forward with the slider 8 and the blade 6 in the operating state, the saw teeth at the front side of the vertically moving blade 6 contacts the workpiece, thus cutting the workpiece with the front-rear direction as the cutting direction. When the blade 6 is pressed by the back roller 86 for the orbital motion and the workpiece is cut, the blade 6 is moved up and pressed forward, increasing the cutting force (lightens the pressing operation) compared with the case of not performing the orbital motion. During the cutting of the workpiece, the blade 6 receives a rearward force from the workpiece (a cut resistance).

Further, when the housing 2 is configured to have any given tilt posture with respect to the base 14 with the bolt 147 once loosened and then the bolt 147 is fastened, the housing 2 is fixed with the tilt posture by the base holder 112 and the clamp plate 146.

The base holder 112 includes the bolt hole 126 on the front portion 116 and extends rearward with respect to the bolt hole 126.

Additionally, the rotation of the motor shaft 35 rotates the centrifugal fan 41, the air goes through the exhaust passage Z, is separated into the right and the left by the partition portion 162 of the guiding member 110, and then is discharged from the exhaust port 169 to, for example, the right and the left (the right and the left of a processing site) of the blade 6 near the base 14.

When the dust collector operates with the dust suction adapter 172 coupled to the dust collector inserted from the rear lower opening 170 of the housing 2, the air around the dust collection air intake port 166 of the guiding member 110 (the rear side of the processing site) is suctioned from the air intake port guiding portion 168, the rear surface of the inclined surface 160, and the air intake guiding portion 164 to the dust suction adapter 172 (the intake passage Y).

When the switch 26 is turned off by the operation of the trigger 27 or the standby switch 29 is turned on, the controller 25 stops the power feeding to the motor 32, and the motor shaft 35 stops, thus stopping the various vertical motions, swing, and air exhaust.

The above-described jigsaw 1 includes the left housing 15 and the right housing 16, the housing 2 that internally includes the motor 32 and the slider 8, the centrifugal fan 41 disposed inside the housing 2, the left groove portion 158 and the right groove portion 308, and the guiding member 110. The left groove portion 158 and the right groove portion 308 are formed depressed outside in the right-left direction on the inner surfaces of at least one of the left housing 15 and the right housing 16 and parts extending from the lower side of the centrifugal fan 41 forward. The guiding member 110 is disposed continuous with the left groove portion 158 and the right groove portion 308 at the inside of the housing 2. The exhaust passage Z is formed of the left groove portion 158, the right groove portion 308, and the guiding member 110, and the exhaust port 169 opens forward. Therefore, the exhaust passage Z (the blower) is simply formed by the left groove portion 158, the right groove portion 308, and the guiding member 110 of the housing 2.

The guiding member 110 includes the partition portion 162 that branches the exhaust passage Z into the right and the left. Accordingly, with the simple structure, the exhaust air wind heading for both the right and the left of the blade 6 generates. This structure features excellent efficiency of blowing the air, thereby efficiently blowing off chips occurred during the cutting of the workpiece.

Further, the guiding member 110 includes the dust collection air intake port 166 penetrating in the front-rear direction, thereby simplifying the configuration of the intake passage Y for dust collection (together with the exhaust passage Z).

Additionally, the controller 25 to control the motor 32 is provided. The cooling air intake port 42b to cool the motor 32 is disposed at the part of the side portion of the battery mounting portion 20 of the housing 2. The controller 25 is disposed with the posture along the imaginary straight line X, which passes through the centrifugal fan 41 and the cooling air intake port 42b. Accordingly, the cooling air passes through along the controller 25 to efficiently cool the controller 25. Additionally, the controller 25 straightens the cooling air in the imaginary straight line X direction to efficiently cool the motor 32 and a similar member.

Additionally, the battery 21 to drive the motor 32 is disposed at the rear of the motor 32. The dust suction adapter 172 coupled to the hose for the dust collection device is detachably attached below the battery 21. Accordingly, the battery 21, the dust suction adapter 172, and the hose are disposed so as not to interfere with one another.

Further, the dust suction adapter 172 includes the bent portion 178. The bent portion 178 connects the front portion 176 and the rear portion 177 of the dust suction adapter 172 such that the rear portion 177 is located at the lower side with respect to the front portion 176. Accordingly, the dust suction adapter 172 and the hose for dust collector do not interfere even when a large-sized battery is mounted.

Further, the base 14 coupled to the housing 2 at the lower side of the housing 2 with the base holder 112 with the conductive property disposed inside the housing 2 is provided. The dust suction adapter 172 contacts the base holder 112 while the dust suction adapter 172 is attached. Accordingly, even if static electricity occurs in the dust suction adapter 172, the base holder 112 exudes the static electricity, thus preventing accumulation of the static electricity in the dust suction adapter 172 or a similar member.

Additionally, the jigsaw 1 includes the main body P, the base 14, the base holder 112, and the bolt 147. The main body P includes the housing 2 made of the resin, the motor 32 disposed inside the housing 2, and the slider 8. The base 14 supports the main body P tiltable to the right and the left. The base holder 112 presses the main body P to the base 14. The bolt 147 penetrates the base 14, the main body P, and the base holder 112. The bolt 147 fixes the main body P to the base 14 by the axial tension. The base holder 112 has the pressing surface extending in the front-rear direction. Therefore, the base 14 is firmly fixed to the main body P by the base holder 112, thus reducing the vibrations at the base 14 and the main body P.

The base holder 112 extends to the rear of the bolt 147. Accordingly, the vibration occurred by the reciprocating rotation motion with the rear side of the slider 8 at the power transmission unit 4 as the fulcrum is effectively reduced by holding at the rear side as possible.

Further, the length of the pressing surface of the base holder 112 in the front-rear direction is equal to or more than the half of the length of the contact surface of the main body P and the base 14 in the front-rear direction. Therefore, the pressing surface of the base holder 112 is lengthened and the base 14 is fixed to the main body P more firmly, thereby further reducing the vibrations at the base 14 and the main body P.

Further, the base holder 112 has the standing portions standing in the vertical direction and extending in the front-rear direction, thus enhancing rigidity of the base holder 112 itself, leading to the firm fixation of the base 14.

Additionally, the front end portion of the base holder 112 is adjacent to the lower left rib 155 and the lower right rib 305 formed at the housing 2. With this structure, the base holder 112 is held at the appropriate position in the housing 2, preventing a deformation of the housing 2.

The base holder 112 is the metal plate having the bent portions, thereby simplifying the formation of the base holder 112 with the high rigidity.

Further, the base holder 112 has the U shape in the front view, thus enhancing the rigidity of the base holder 112 itself, leading to the firm fixation of the base 14.

Further, the base holder 112 includes the fastener overlap portion. The bolt 147 penetrates the fastener overlap portion so as to overlap with the fastener overlap portion in the side view. Accordingly, the base holder 112 does not interfere with the bolt 147 and is efficiently disposed surrounding the bolt 147.

Additionally, the base holder 112 has the front small piece portion 122 at the front end portion and the rear small piece portion 124 at the rear end portion. The housing 2 includes the front small piece receiving portion (the front rib 132), which receives the front small piece portion 122, and the rear small piece receiving portion (the rear rib 134). With the above structure, the base holder 112 is held at the appropriate position in the housing 2.

The front small piece receiving portion is disposed at the top and the bottom of the front small piece portion 122. The rear small piece receiving portion is disposed at the top and the bottom of the rear small piece portion 124. Accordingly, the movement of the base holder 112 can be restricted in the vertical direction, which is the thickness direction of the front small piece portion 122 and the rear small piece portion 124. Since the thicknesses of the front small piece portion 122 and the rear small piece portion 124, namely, the thickness of the base holder 112 is the thickness of the plate material, the dimensions are easily stabilized. Therefore, the front small piece portion 122, the rear small piece portion 124, the front small piece receiving portion, and the rear small piece receiving portion are easily formed.

Further, the jigsaw 1 includes the main body P, the handle Q, the battery 21, and the battery mounting portion 20. The main body P includes the housing 2, the motor 32 disposed inside the housing 2, and the slider 8. The handle Q is disposed at the upper portion of the main body P and above the motor 32. The battery 21 has the second mounting surface N and supplies the motor 32 with the electric power. The battery mounting portion 20 is disposed at the main body P. The battery mounting portion 20 has the first mounting surface M. By sliding the battery 21 in the direction along the first mounting surface M, the battery 21 is mountable to the battery mounting portion 20 while the first mounting surface M faces the second mounting surface N. The battery 21 is mounted to the battery mounting portion 20 such that the second mounting surface N is the top surface of the battery 21. Accordingly, with the top handle type jigsaw 1 where the independent handle Q is disposed at the upper portion of the motor 32, even if the batteries 21 with various capacities or a similar member are mounted or the battery 21 is not mounted, the front-rear length is unchangeable, ensuring facilitating the handling.

Additionally, the battery 21 overlaps with the motor 32 in the front view in the state of being mounted to the battery mounting portion 20. Accordingly, even when the first mounting surface M faces downward, the battery 21 is comparatively heightened in the vertical direction, the mounting space related to the battery 21 is sufficiently secured, the jigsaw 1 is configured compact even with the mounting of the large-capacity battery 21, and by approaching the battery 21 to the motor 32, the vibration is reduced.

Further, the battery 21 overlaps with the handle Q in the top view in the state of being mounted to the battery mounting portion 20. Therefore, compared with the case of not overlapping, the jigsaw 1 is configured to be further compact in the front-rear direction.

Further, the plate-shaped controller 25 to control the motor 32 is provided. The controller 25 is disposed above the battery 21 having the posture along the second mounting surface N of the battery 21, which is mounted to the battery mounting portion 20. With the above configuration, the jigsaw 1 is made compact in the vertical direction and especially, the peripheral portion of the battery mounting portion 20 is made compact even when the large-capacity battery 21 is mounted.

Additionally, the controller 25 overlaps with the handle Q in the top view. Accordingly, the compact jigsaw 1 is configured in the front-rear direction.

FIG. 14 to FIG. 25 are drawings of a jigsaw 201 according to the second embodiment of the embodiments corresponding to FIG. 1 to FIG. 12.

The jigsaw 201 according to the second embodiment is formed similar to the jigsaw 1 of the first embodiment excluding the handle and the various switches and identical reference numerals are assigned for the similar members and parts.

The jigsaw 201 does not include an independent handle in the main body P, and a top surface of a housing 202, which houses the power unit 3, serves as a body handle QB (a body handle type).

Figure 24:
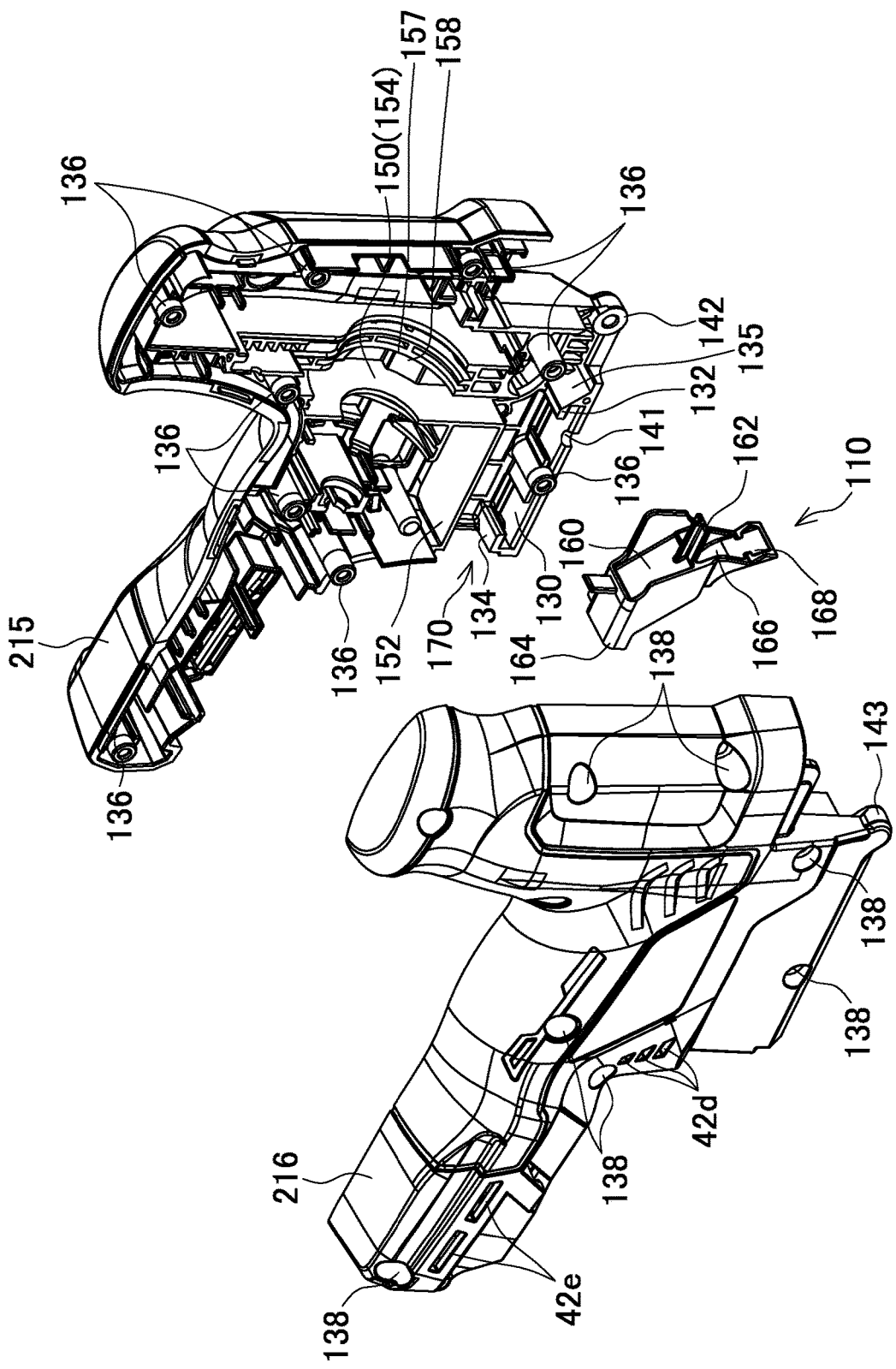
FIG. 24 is a perspective view of a left housing, a right housing, and a guiding member in FIG. 16.
Figure 25:
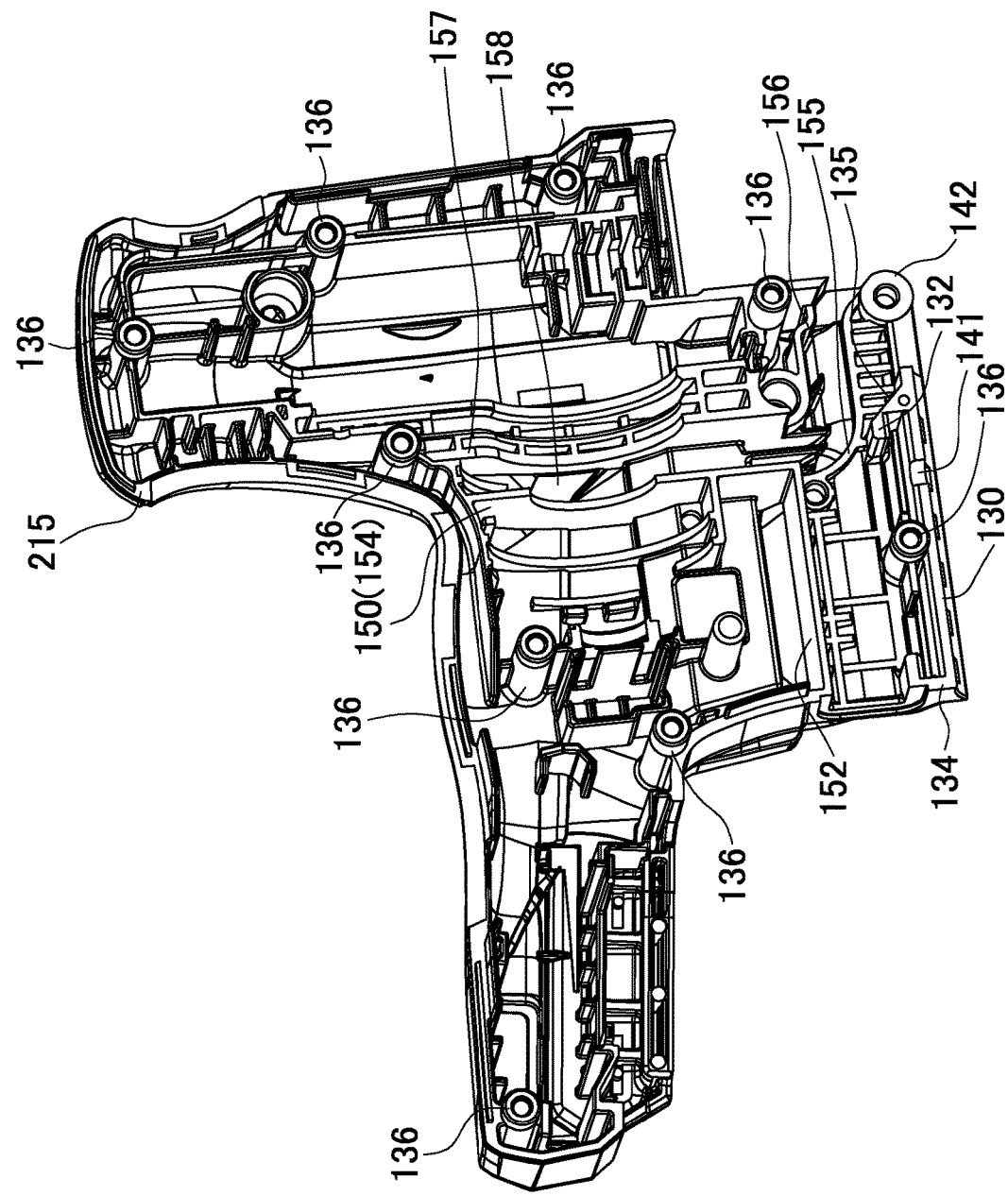
FIG. 25 is a perspective view of the left housing in FIG. 24.

The housing 202 includes a left housing 215 and a right housing 216. A cooling air intake port 42c similar to the cooling air intake port 42a of the first embodiment is bored on the left housing 215. A plurality of cooling air intake ports 42d are also bored on the right housing 216. Further, at the side portion of the battery mounting portion 20 in the right housing 216, a plurality of cooling air intake ports 42e with a slit shape in a front-rear direction and arranged in the front-rear direction are bored (FIG. 24).

The jigsaw 201 does not include the switch 26 and the trigger 27 according to the first embodiment and instead includes a switch 228, which includes an on-button 226 and a stand-by button 227. The on-button 226 and the stand-by button 227 are exposed from the left surface of the housing 202. The controller 25 electrically connected to the switch 228 enters a standby state when the stand-by button 227 is pressed and supplies the motor 32 with the electric power when the on-button 226 is pressed.

Since the jigsaw 201 of the second embodiment has the structure of the lower portion of the housing 202 similar to the first embodiment and includes the power unit 3, the power transmission unit 4, the slider 8, the orbital motion mechanism 10, the counter weight 12, and the base 14, the jigsaw 201 has actions similar to the first embodiment.

Especially, the jigsaw 201 includes the left housing 215 and the right housing 216, the housing 202 that internally includes the motor 32 and the slider 8, the centrifugal fan 41 disposed inside the housing 202, the left groove portion 158 and the right groove portion 308, and the guiding member 110. The left groove portion 158 and the right groove portion 308 are formed depressed outside in the right-left direction on the inner surfaces of at least one of the left housing 215 and the right housing 216 and parts extending from the lower side of the centrifugal fan 41 forward. The guiding member 110 is disposed continuous with the left groove portion 158 and the right groove portion 308 at the inside of the housing 202. The exhaust passage Z is formed of the left groove portion 158, the right groove portion 308, and the guiding member 110, and the exhaust port 169 opens forward, thus simplifying the formation of the exhaust passage Z (the blower) by the left groove portion 158, the right groove portion 308, and the guiding member 110 of the housing 202.

Additionally, the jigsaw 201 includes the main body P, the base 14, the base holder 112, and the bolt 147. The main body P includes the housing 202 made of the resin, the motor 32 disposed inside the housing 202, and the slider 8. The base 14 supports the main body P tiltable to the right and the left. The base holder 112 presses the main body P to the base 14. The bolt 147 penetrates the base 14, the main body P, and the base holder 112. The bolt 147 fixes the main body P to the base 14 by the axial tension. The base holder 112 has the pressing surface extending in the front-rear direction. This configuration firmly fixes the base 14 to the main body P by the base holder 112, thus reducing the vibrations at the base 14 and the main body P.

Additionally, the controller 25 to control the motor 32 is provided. The cooling air intake ports 42e to cool the motor 32 are disposed at the part of the side portion of the battery mounting portion 20 of the housing 202. The controller 25 is disposed with the posture along the imaginary straight line X, which passes through the centrifugal fan 41 and the cooling air intake port 42e. Accordingly, the cooling air passes through along the controller 25, efficiently cooling the controller 25. Additionally, the controller 25 straightens the cooling air in the imaginary straight line X direction, efficiently cooling the motor 32 and a similar member.

The disclosure is not limited to the above-described embodiments but, for example, the following changes may be made as necessary.

Instead of the slider or being coupled to the slider, a rod may be disposed, and a blade may be mounted to the rod. In this case, a drive unit serves as the rod. Since the rod performs the orbital motion, a support shaft in the right-left direction may be provided at the upper portion. The slider and the rod can have a cylindrical shape, an elliptic cylinder shape, a quadrangular prism shape, a hexagonal prism shape, and a similar shape.

The various cam portions of the intermediate gear may be separate from one another, may be supported by shafts different from one another, may be driven by driving sources different from one another, and the phase may be set other than 0° or 180°.

The blade may include an edge other than saw teeth.

For example, configuring the partition portion of the guiding member so as to partition the entire exhaust port in the vertical direction may completely split the exhaust port to the right and the left. Alternatively, for example, disposing the partition portion at and around the air intake port may split a part of or the entire air intake port to the right and the left.

The right and the left housings can be changed in, for example, the shape and the material, for example, by covering a lid-shaped left housing to a bus tab-shaped right housing or making a part of or all of the right and the left housings from a metal and forming a part of or all of the right and the left housings into an elastic body. The shape, the material, and a similar specification of other members and parts are also changeable.

A bolt (a fastener) related to the base holder (the fastening member) may be a pin, a latch, a clamp, a clip, or a combination of these members.

The battery may be a primary battery that cannot be charged. Instead of the power feeding by the battery, power feeding from a commercial power supply using a power supply cord may be used.

The connection aspects of the motor and the lead wire are variously changeable. The counts and the locations of various members such as the numbers of coils and magnets for the motor can be increased and decreased as necessary, and the coil and the magnet can be disposed at different locations. The locations of the various elements may be variously changed such as disposing the switching elements on the sensor substrate. The motor may be a motor with brush.

The various switches may be omitted as necessary or may be configured into another format, or a new switch may be disposed.

The embodiments may be applied to, for example, a reciprocating saw and a cutter instead of the jigsaw.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A jigsaw comprising:
    a jigsaw main body including,
        a housing,
        a motor disposed inside the housing, and
        a battery mounting portion having a first mounting surface facing downward;
    a handle disposed at an upper portion of the jigsaw main body and above the motor; and
    a battery having a second mounting surface, the battery configured to supply the motor with an electric power, the battery being slidable along the first mounting surface, the battery being mountable to the battery mounting portion with the first and second mounting surfaces facing each other;
    wherein the battery is mountable to the battery mounting portion such that the battery overlaps with the motor in a front view.

2. The jigsaw according to claim 1, wherein
    the battery is mountable to the battery mounting portion such that the battery overlaps with the handle in a top view.

3. The jigsaw according to claim 1, further comprising
    a plate-shaped controller configured to control the motor, the controller being disposed above the battery and being along the second mounting surface.

4. The jigsaw according to claim 2, further comprising
a plate-shaped controller configured to control the motor,
the controller being disposed above the battery and being along the second mounting surface.

5. The jigsaw according to claim 3, wherein
the controller is arranged such that the controller overlaps with the handle in a top view.

6. The jigsaw according to claim 4, wherein
the controller is arranged such that the controller overlaps with the handle in a top view.

7. The jigsaw according to claim 1, further comprising:
a centrifugal fan disposed inside the housing;
a cooling air intake port disposed at a rear part at the housing with respect to the motor, the cooling air intake port being configured to cool the motor; and
a controller configured to control the motor, the controller being disposed along an imaginary straight line passing through the centrifugal fan and the cooling air intake port.

8. The jigsaw according to claim 1, further comprising:
a dust suction adapter coupled to a hose for a dust collection device, the dust suction adapter being detachably attached below the battery;
wherein the battery is disposed at a rear of the motor.

9. The jigsaw according to claim 8, wherein
the dust suction adapter includes,
    a front portion,
    a rear portion located below the front portion, and
    a bent portion connecting the front portion and the rear portion.

10. The jigsaw according to claim 8, further comprising:
a fastening member having a conductive property and disposed inside the housing; and
a base connected to the housing at a lower side of the housing with the fastening member;
wherein the dust suction adapter is mountable such that the dust suction adapter contacts the fastening member.

11. The jigsaw according to claim 1, wherein:
the battery is disposed at the rear of the motor; and
the battery is mountable to the battery mounting portion by sliding in a front-rear direction.

12. The jigsaw according to claim 1, further comprising:
a controller configured to control the motor, the controller including a switching element;
wherein the motor is a brushless motor including,
    a stator having a plurality of coils, and
    a rotor,
wherein the switching element switches an electric power supply to the plurality of coils.

13. A jigsaw comprising:
a jigsaw main body including:
    a housing;
    a motor disposed inside the housing; and
    a battery mounting portion having a first mounting surface facing downward;
a handle disposed at an upper portion of the jigsaw main body and above the motor;
a battery having a second mounting surface, the battery configured to supply the motor with an electric power, the battery being slidable along the first mounting surface, the battery being mountable to the battery mounting portion with the first and second mounting surfaces facing each other; and
a plate-shaped controller configured to control the motor, the controller being disposed above the battery and being along the second mounting surface.

14. A jigsaw comprising:
a jigsaw main body including:
    a housing;
    a motor disposed inside the housing; and
    a battery mounting portion having a first mounting surface facing downward;
a handle disposed at an upper portion of the jigsaw main body and above the motor;
a battery having a second mounting surface, the battery configured to supply the motor with an electric power, the battery being slidable along the first mounting surface, the battery being mountable to the battery mounting portion with the first and second mounting surfaces facing each other;
a dust suction adapter coupled to a hose for a dust collection device, the dust suction adapter being detachably attached below the battery;
a fastening member having a conductive property and disposed inside the housing; and
a base connected to the housing at a lower side of the housing with the fastening member; wherein:
the battery is disposed at a rear of the motor; and
the dust suction adapter is mountable such that the dust suction adapter contacts the fastening member.

* * * * *